(12) United States Patent
Oroza

(10) Patent No.: US 11,746,751 B1
(45) Date of Patent: Sep. 5, 2023

(54) AIRFLOW POWER GENERATING APPARATUS

(71) Applicant: Carlos Gabriel Oroza, Dallas, TX (US)

(72) Inventor: Carlos Gabriel Oroza, Dallas, TX (US)

( * ) Notice: Subject to any disclaimer, the term of this patent is extended or adjusted under 35 U.S.C. 154(b) by 0 days.

(21) Appl. No.: 15/932,102

(22) Filed: Feb. 3, 2018

(51) Int. Cl.
  *F03D 9/32* (2016.01)
  *F03D 3/06* (2006.01)
  (Continued)

(52) U.S. Cl.
  CPC ............... *F03D 9/32* (2016.05); *B60L 8/006* (2013.01); *F03D 3/002* (2013.01); *F03D 3/04* (2013.01); *F03D 3/061* (2013.01); *F03D 7/06* (2013.01); *F03D 9/11* (2016.05); *F03D 9/25* (2016.05); *F03D 80/40* (2016.05); *F03D 80/55* (2016.05); *H02K 7/1838* (2013.01); *F05B 2220/7062* (2013.01); *F05B 2240/12* (2013.01); *F05B 2240/2211* (2013.01);
  (Continued)

(58) Field of Classification Search
  CPC ... F03D 9/32; F03D 3/002; F03D 3/04; F03D 3/061; F03D 7/06; F03D 9/11; F03D 9/25; F03D 80/40; F03D 80/55; B60L 8/006; H02K 7/1838; F05B 2220/7062; F05B 2240/12; F05B 2240/2211; F05B 2240/2212; F05B 2270/101; F05B 2270/327
  USPC .................................. 290/52, 54, 55; 415/4.2
  See application file for complete search history.

(56) References Cited

U.S. PATENT DOCUMENTS

| 299,563 | A | * | 6/1884 | Martin | .............................. 416/44 |
| 1,586,914 | A | * | 6/1926 | Palm | ...................... F03D 3/0418 |
| | | | | | 415/150 |

(Continued)

*Primary Examiner* — Pedro J Cuevas
(74) *Attorney, Agent, or Firm* — Stephen Y. Liu; Carstens, Allen & Gourley, LLP

(57) ABSTRACT

Electric and hydrogen technology automobiles and vehicles such as trucks, buses, ships and boats are believed to be the future of transportation; however for the time being, the problems surrounding the technologies are significant and have kept the consumers away for various reasons including the capacity of batteries and fuel cells, the lack of filling stations, and most of all the limited distance the vehicles can travel without a recharge, which for small electric vehicles can take up to 20 minutes before they can continue to travel with a full battery or fuel cell. Commercial vehicles in particular; cannot take the time to stop frequently and worst yet take the significant amount of time that it would take to recharge their systems. Hybrid vehicles still rely on gasoline which is available to increase the travel distance, but customers concerned for the environment have not yet embraced the solution and larger vehicles such as commercial trucks are not about to take the risk of being left out without fuel under any circumstances. This current invention "Airflow Power Generating Apparatus' is for use in present and future electric and hydrogen technology vehicles and solves the challenges present today as it provides a system to charge batteries and fuel cells while the vehicle is moving forward. This system will extend the distance vehicles can travel or may eliminate completely the need to recharge batteries of fuel cells at homes or at charge stations.

20 Claims, 37 Drawing Sheets

(51) Int. Cl.
*F03D 9/25* (2016.01)
*F03D 80/40* (2016.01)
*F03D 80/55* (2016.01)
*F03D 3/04* (2006.01)
*F03D 9/11* (2016.01)
*F03D 7/06* (2006.01)
*B60L 8/00* (2006.01)
*H02K 7/18* (2006.01)
*F03D 3/00* (2006.01)

(52) U.S. Cl.
CPC . *F05B 2240/2212* (2013.01); *F05B 2270/101* (2013.01); *F05B 2270/327* (2013.01)

(56) References Cited

U.S. PATENT DOCUMENTS

| | | | | | |
|---|---|---|---|---|---|
| 3,556,239 | A | * | 1/1971 | Spahn | B60K 17/04 180/2.2 |
| 3,713,503 | A | * | 1/1973 | Haan | B60K 16/00 180/2.2 |
| 3,876,925 | A | * | 4/1975 | Stoeckert | B60K 16/00 322/1 |
| 4,002,218 | A | * | 1/1977 | Horvat | B60K 16/00 180/2.2 |
| 4,075,545 | A | * | 2/1978 | Haberer | B60K 1/04 322/35 |
| 4,084,918 | A | * | 4/1978 | Pavlecka | F03D 1/04 290/55 |
| 4,134,469 | A | * | 1/1979 | Davis | B60K 6/48 180/2.2 |
| 4,168,759 | A | * | 9/1979 | Hull | B60K 16/00 180/2.2 |
| 4,179,007 | A | * | 12/1979 | Howe | B60K 6/48 180/2.2 |
| 4,254,843 | A | * | 3/1981 | Han | B60K 1/00 180/165 |
| 4,423,368 | A | * | 12/1983 | Bussiere | B60K 16/00 322/35 |
| 4,437,698 | A | * | 3/1984 | Tantalo | B62D 35/001 296/180.3 |
| 4,520,273 | A | * | 5/1985 | Rowe | F03B 17/063 290/52 |
| 4,729,072 | A | * | 3/1988 | Oroza | B60Q 1/0041 362/517 |
| 5,009,569 | A | * | 4/1991 | Hector, Sr. | F03D 3/04 415/4.1 |
| D336,762 | S | * | 6/1993 | Miller | D25/1 |
| 5,280,827 | A | * | 1/1994 | Taylor | B60K 1/04 180/165 |
| 5,287,004 | A | * | 2/1994 | Finley | B60K 16/00 290/55 |
| 5,296,746 | A | * | 3/1994 | Burkhardt | H02J 7/34 290/55 |
| 5,463,257 | A | * | 10/1995 | Yea | F03D 3/0418 290/44 |
| 5,490,572 | A | * | 2/1996 | Tajiri | H01M 10/633 180/68.5 |
| 5,680,032 | A | * | 10/1997 | Pena | B60K 6/105 290/52 |
| 5,986,429 | A | * | 11/1999 | Mula, Jr. | H02J 7/1415 290/55 |
| 6,138,781 | A | * | 10/2000 | Hakala | B60K 16/00 180/2.2 |
| 6,700,215 | B2 | * | 3/2004 | Wu | B60K 16/00 290/44 |
| 6,758,295 | B2 | * | 7/2004 | Fleming | F16D 61/00 180/165 |
| 6,765,309 | B2 | * | 7/2004 | Tallal, Jr. | F03D 13/20 290/44 |
| 6,838,782 | B2 | * | 1/2005 | Vu | B60K 6/48 290/55 |
| 6,857,492 | B1 | * | 2/2005 | Liskey | B60K 16/00 180/165 |
| 6,882,059 | B1 | * | 4/2005 | DePaoli | B60L 8/006 290/55 |
| 6,897,575 | B1 | * | 5/2005 | Yu | B60K 16/00 290/44 |
| 6,926,346 | B1 | * | 8/2005 | Wong | B62D 35/001 296/180.1 |
| 6,943,461 | B2 | * | 9/2005 | Kaploun | H02K 7/183 290/43 |
| 6,966,394 | B2 | * | 11/2005 | Fleming | F03D 9/25 180/165 |
| 7,135,786 | B1 | * | 11/2006 | Deets | F03D 9/32 290/55 |
| 7,385,302 | B2 | * | 6/2008 | Jonsson | F03D 3/068 290/42 |
| 7,387,182 | B2 | * | 6/2008 | Fleming | B60L 50/16 180/165 |
| 7,434,636 | B2 | * | 10/2008 | Sutherland | B60K 6/46 180/2.2 |
| 7,445,064 | B2 | * | 11/2008 | Kim | B60K 16/00 180/2.2 |
| 7,497,287 | B2 | * | 3/2009 | Kunikata | B60K 11/02 180/68.1 |
| 7,635,924 | B1 | * | 12/2009 | Chen | F03D 7/048 290/44 |
| 7,641,005 | B2 | * | 1/2010 | Cong | F03D 3/02 180/2.2 |
| 7,665,554 | B1 | * | 2/2010 | Walsh | F03D 1/02 180/2.2 |
| 7,780,411 | B2 | * | 8/2010 | Yan | F03D 3/067 415/1 |
| 7,789,182 | B2 | * | 9/2010 | Bradley | B60K 16/00 180/165 |
| 7,816,802 | B2 | * | 10/2010 | Green | F03D 3/005 290/44 |
| 7,854,278 | B2 | * | 12/2010 | Kaufman | F03D 9/17 180/2.2 |
| 7,942,624 | B1 | * | 5/2011 | Erb | F03D 3/068 415/4.2 |
| 8,098,040 | B1 | * | 1/2012 | Botto | B60L 8/006 290/44 |
| 8,109,357 | B1 | * | 2/2012 | Glover | B60K 17/10 180/305 |
| 8,162,589 | B2 | * | 4/2012 | Moore | B60K 16/00 415/4.2 |
| 8,177,479 | B2 | * | 5/2012 | Watts | B60K 16/00 415/4.1 |
| 8,181,724 | B2 | * | 5/2012 | Cong | F03D 3/005 180/2.2 |
| 8,220,570 | B1 | * | 7/2012 | Knickerbocker | F03D 9/32 180/2.2 |
| 8,240,416 | B2 | * | 8/2012 | Cong | F03D 9/17 180/2.2 |
| 8,281,442 | B2 | * | 10/2012 | Eggleston | F03D 80/50 15/21.1 |
| 8,371,401 | B1 | * | 2/2013 | Illustrato | H02S 10/12 180/2.2 |
| 8,443,571 | B2 | * | 5/2013 | Tadayon | F03D 13/10 52/745.18 |
| 8,509,992 | B1 | * | 8/2013 | Bosworth | H02J 7/32 701/36 |
| 8,579,054 | B2 | * | 11/2013 | Knickerbocker | F03D 9/32 180/2.2 |
| 8,710,691 | B2 | * | 4/2014 | Haddad | B60L 8/006 290/55 |
| 8,829,704 | B2 | * | 9/2014 | Grigg | F03D 3/002 290/44 |
| 8,911,703 | B2 | * | 12/2014 | McAlister | B01J 19/20 423/650 |
| 8,967,302 | B2 | * | 3/2015 | Tran | B60K 16/00 180/2.2 |
| 9,103,317 | B2 | * | 8/2015 | Garcia | F03D 9/11 |
| 9,115,685 | B2 | * | 8/2015 | Ross | F03B 13/264 |
| 9,428,061 | B1 | * | 8/2016 | Ripley | B60L 50/53 |
| 9,446,670 | B1 | * | 9/2016 | McCorkindale | F03D 3/0445 |

(56) References Cited

U.S. PATENT DOCUMENTS

| | | | |
|---|---|---|---|
| 9,546,644 B2* | 1/2017 | Oroza | C25B 15/00 |
| 9,669,702 B2* | 6/2017 | Lozano | B60K 8/00 |
| 9,731,608 B1* | 8/2017 | Knickerbocker | B60L 8/006 |
| 9,738,330 B2* | 8/2017 | Wolf | F03D 9/32 |
| 9,745,960 B2* | 8/2017 | Dietzel | F03D 9/11 |
| 9,803,623 B2* | 10/2017 | Burkle | F03D 9/25 |
| 10,160,329 B2* | 12/2018 | Abou-Zeid | B60H 1/24 |
| 10,160,330 B2* | 12/2018 | Kim | B60L 8/006 |
| 10,173,533 B1* | 1/2019 | Bird | B60K 1/00 |
| 10,479,197 B1* | 11/2019 | Kim | F03D 9/11 |
| 10,500,963 B2* | 12/2019 | Sikroria | B62D 35/00 |
| 10,563,897 B2* | 2/2020 | Gongate | F03D 9/32 |
| 10,583,707 B2* | 3/2020 | Kaskowicz | F03B 13/00 |
| 10,641,241 B2* | 5/2020 | Wang | H02J 7/35 |
| 10,655,604 B1* | 5/2020 | Parker | F03D 7/0272 |
| 10,712,068 B2* | 7/2020 | Gongate | F03D 9/32 |
| 10,723,193 B2* | 7/2020 | Kaskowicz | F03B 1/00 |
| 11,136,964 B2* | 10/2021 | Parker | F01D 17/162 |
| 11,203,242 B2* | 12/2021 | Kaskowicz | F15B 1/027 |
| 2002/0066608 A1* | 6/2002 | Guenard | F03D 15/10 180/65.285 |
| 2002/0109358 A1* | 8/2002 | Roberts | F03D 3/0409 290/54 |
| 2002/0153178 A1* | 10/2002 | Limonius | B60L 8/00 180/2.2 |
| 2003/0122380 A1* | 7/2003 | Harbison | F03D 3/02 290/55 |
| 2003/0205482 A1* | 11/2003 | Allen | C25B 9/06 205/630 |
| 2004/0084908 A1* | 5/2004 | Vu | B60K 6/48 290/55 |
| 2004/0113431 A1* | 6/2004 | Huang | F03D 3/04 290/55 |
| 2004/0238248 A1* | 12/2004 | Fleming | F03D 9/12 180/165 |
| 2005/0029027 A1* | 2/2005 | Kunikata | B60K 11/02 180/68.1 |
| 2006/0113118 A1* | 6/2006 | Kim | B60L 8/006 180/2.2 |
| 2006/0137927 A1* | 6/2006 | Fleming | B60L 7/12 180/165 |
| 2006/0275105 A1* | 12/2006 | Roberts | F03D 3/02 415/4.2 |
| 2008/0023037 A1* | 1/2008 | Kool | B08B 9/00 134/22.1 |
| 2008/0309089 A1* | 12/2008 | Lin | F03B 17/065 290/54 |
| 2010/0101874 A1* | 4/2010 | Cong | F03D 3/0427 180/2.2 |
| 2010/0101884 A1* | 4/2010 | Cong | F03D 9/17 180/165 |
| 2010/0122855 A1* | 5/2010 | Cong | F03D 9/17 180/2.2 |
| 2010/0122857 A1* | 5/2010 | Cong | F03D 3/005 180/2.2 |
| 2010/0122858 A1* | 5/2010 | Cong | F03D 9/32 180/2.2 |
| 2010/0132137 A1* | 6/2010 | Eggleston | B08B 1/02 15/21.1 |
| 2010/0213719 A1* | 8/2010 | Botan | F03D 1/04 290/55 |
| 2010/0237627 A1* | 9/2010 | Socolove | F03D 9/00 290/55 |
| 2011/0067353 A1* | 3/2011 | Tadayon | F03D 13/10 52/745.18 |
| 2011/0133468 A1* | 6/2011 | Leith | F03D 3/002 290/55 |
| 2012/0049525 A1* | 3/2012 | Owens | F03D 3/04 290/55 |
| 2012/0068464 A1* | 3/2012 | Farb | F03D 3/061 290/52 |
| 2012/0119504 A1* | 5/2012 | Vigaev | F03D 3/02 290/55 |
| 2012/0299526 A1* | 11/2012 | Lambert | F03D 9/11 74/DIG. 9 |
| 2013/0043082 A1* | 2/2013 | Tran | B60K 16/00 180/2.2 |
| 2013/0127393 A1* | 5/2013 | Garcia | F03D 15/10 290/55 |
| 2013/0158828 A1* | 6/2013 | McAlister | B01J 19/20 701/70 |
| 2014/0097082 A1* | 4/2014 | Oroza | C25B 15/00 204/242 |
| 2017/0175711 A1* | 6/2017 | Burkle | F03D 9/25 |
| 2017/0342964 A1* | 11/2017 | Cianflone | F03D 9/32 |
| 2018/0156192 A1* | 6/2018 | Wang | H02J 7/1415 |
| 2019/0249913 A1* | 8/2019 | Gongate | B60L 50/15 |
| 2020/0141622 A1* | 5/2020 | Gongate | B60L 1/003 |

* cited by examiner

DIVERSE CONFIGURATION OF TURBINE AND GENERATORS CONNECTIONS

EMBODIMENT USING TURBINE PERMANENT MAGNETS AND STATOR.

EMBODIMENT USING TURBINE PERMANENT MAGNETS AND STATOR WITHIN THE TURBINE HOLLOW CORE.

| Outer Rotor | | | | |
|---|---|---|---|---|
| Model | Rated output power (KW) | Rated speed (RPM) | Rated output voltage | Weight (Kg) |
| Hiest 770 | 15 | 260 | 380VAC | 165 |
| | 10 | 180 | 220VAC/380VAC | |
| | 7.5 | 150 | 220VAC/380VAC | |
| | 5 | 100 | 220VAC/380VAC | |
| Hiest 700 | 10 | 250 | 380VAC | 135 |
| | 7.5 | 200 | 380VAC | |
| | 5 | 150 | 220VAC/380VAC | |
| | 4 | 100 | 96VAC/240VAC | |
| | 3 | 100 | 220VAC/380VAC | |
| | | | | |
| Due to the simple structure and especially the low wind speed requirements, it can work efficiently | | | | |
| The generator has no iron core, the starting torque is about 0.5N•M, and the starting wind speed is only about 1.5m/s. The generator adopts brushless, non-magnetic damping, rare earth permanent magnet technology, and the system efficiency is high, which can reach more than 90%. | | | | |

FIGURE 25

SWITCHING SYSTEM POSITIONS A & B

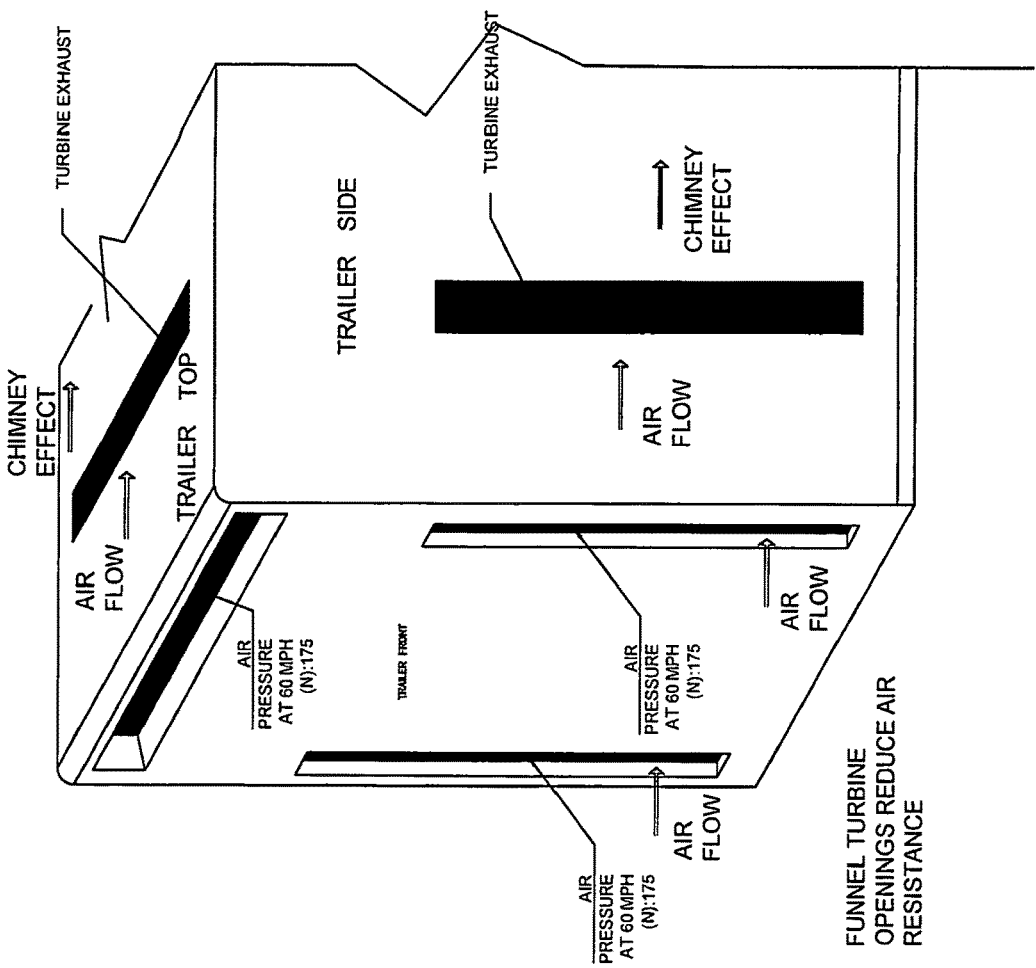
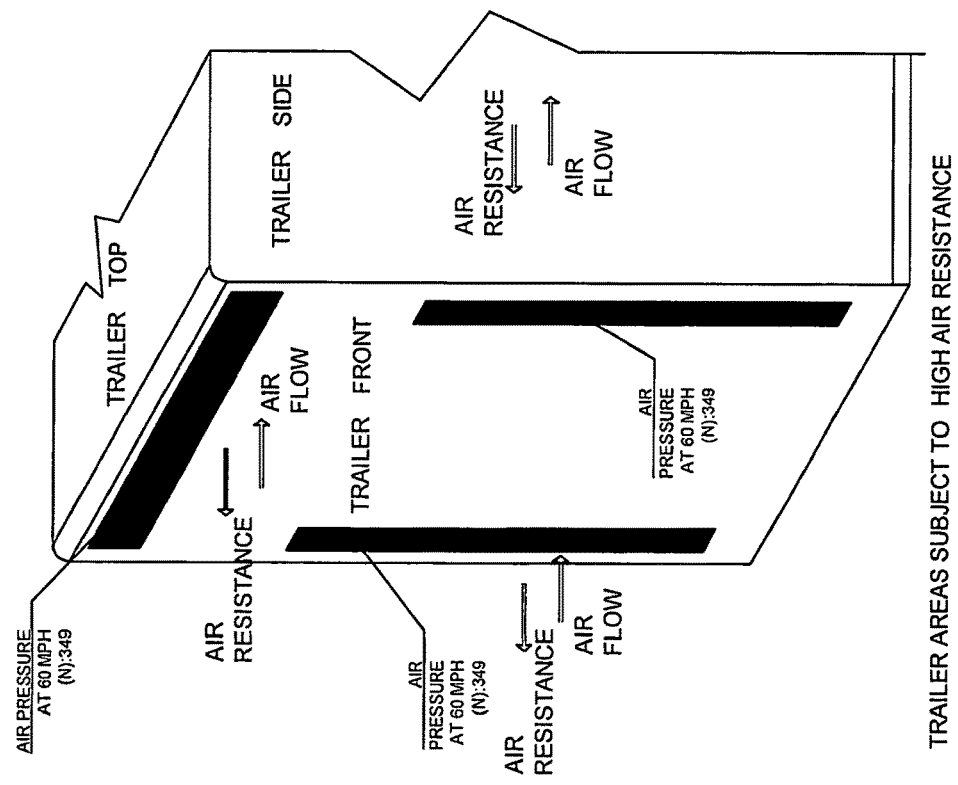
FIGURE 38

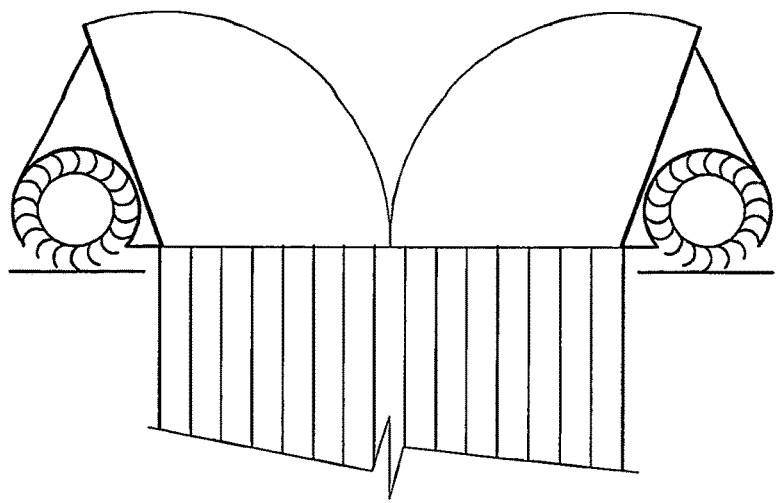
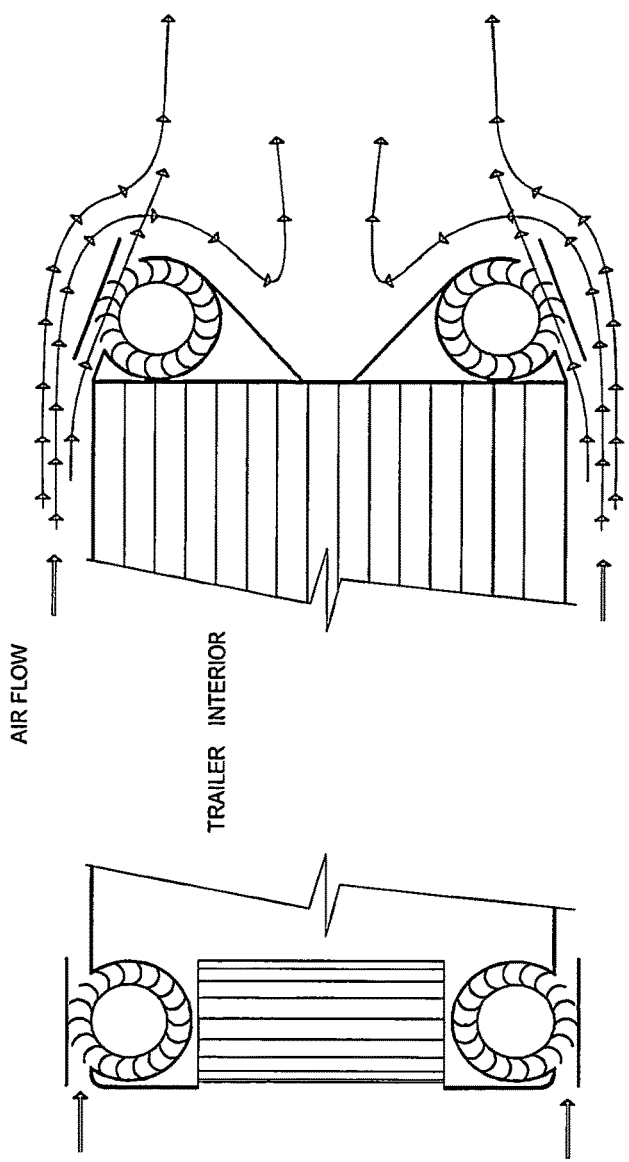
FIGURE 44

AIRFLOW POWER GENERATING APPARATUS

CROSS REFERENCE TO RELATED APPLICATIONS

The present patent application expands the use of the turbine apparatus for installation in buildings, U.S. Pat. No. 9,546,644 B2 issued in my name as the inventor, on Jan. 17, 2017; disclosure of which herein is incorporated by reference to the extent not inconsistent with the present disclosure. The present invention of Airflow Power Generating Apparatus intended for use in electric and hydrogen technology vehicles shares some of the concepts which are not in conflict as I am the inventor of both.

BACKGROUND OF THE INVENTION

The present invention uses air flow power to recharge batteries or fuel cells while an electric or hydrogen technology vehicle is in motion. As air flows through capturing openings and or funnels, it rotates a turbine or a plurality of turbines which transform kinetic energy to electrical DC current through generators which feed energy to recharge the batteries and/or fuel cells in the vehicle. The Airflow Power Generating Apparatus for use in electric or hydrogen technology vehicles addresses the challenge of refueling the vehicle frequently either with fossil fuels or hydrogen or with electrical charge at plug in stations.

There is an effort by manufacturers of new electric or hydrogen vehicles to locate filling stations where there is a concentration of consumers such as near important roads and highways. The first challenge with these locations is that the consumer does not want to take the time to sit and wait while the vehicle is recharged, and the second challenge is that filling stations are not available in most locations. Ideal places for recharge are parking lots and garages where recharge can occur. Vehicles may be charged at homes, commercial and residential use buildings, malls, grocery stores, etc.; where the consumer can recharge the batteries or fuel cells during the time he is away from it for extended periods and taking the time to recharge during those periods does not become an inconvenience. My Airflow Power Generating Apparatus for use in electric and hydrogen technology vehicles provides an external continuous feed of DC energy while the vehicle is in forward motion. There is no previous art addressing the challenges this invention resolves such as reducing or eliminating the use of added fuels to compensate for and to recharge batteries or fuel cells.

There is neither perpetual motion without an external source of energy, nor there is a way to get more energy from less, therefore for an electric or hydrogen technology vehicle to move; the batteries and fuel cells need to be sufficiently charged to maintain the level required for a vehicle to travel a distance satisfactory to the consumer needs. Currently batteries and fuel cells cannot keep enough charge to support travel distance without having to be recharged frequently. The Chevy Volt one of GM's most celebrated electric vehicle can travel up to 400 miles, however only 53 miles of these miles are with battery power alone, which makes the Volt not technically and electric vehicle but rather a standard vehicle with an electric accessory to extend its travel distance.

A travelling vehicle has many forces acting against it such as wind, environmental friction, road friction and even the resistance of the vehicle's own running parts. These conditions have made it impossible to run any vehicle without recharging batteries or fuel cells with energy coming from external sources. The Airflow Power Generating Apparatus when used in Electric and Hydrogen Technology Vehicles, provides de needed external energy for recharge by using air flowing through its turbines which convert airflow to kinetic energy and further electrical energy that is converted into electrical DC current through generators driven by the turbines. Air flow provides an infinite and constant source of power to charge batteries and fuel cells while the vehicle is in forward motion.

Depending on the size and weight of the vehicle and the capacity of batteries or fuel cells; a vehicle with the Airflow Power Generating Apparatus used in an electric or hydrogen technology vehicle may not need any other external sources of energy and could operate on demand for as long as batteries or fuel cells can be charged. The Air flow apparatus or a plurality of apparatuses installed in a vehicle that travels at a given speed will have a constant air flow at an equivalent speed for the rotation of the apparatus turbine. As an example, a vehicle traveling at 75 miles per hour will provide an airflow through the turbines at an equivalent speed. Air flow turbines will rotate and produce energy at any travel speed. Turbines may be aided by magnets to keep them rotating in slow motion, so they may have immediate rotation as soon as the vehicle moves forward. On board voltage regulators will control produced DC current to prevent damage to batteries and fuel cells during recharge.

Some vehicles may have batteries or systems where batteries or fuel cells can be charged while the vehicle is traveling. Others may require that the battery or fuel cell is not used while charging, thus a plurality of batteries or fuel cells should be used with a switching mechanism that would allow one battery to be charged while the other one is in use. Once the charge of the battery or fuel cell being used has reached the level for recharge, the switching system will shift to connect with the fully charged battery or fuel cell and the vehicle will then use the power of the fully charged battery or fuel cell. The one previously being used, after switching will be independent from the vehicle and will get charged while the other battery or fuel cell provides the power to the vehicle.

Variable vehicle speed will provide variable voltage and while batteries and fuel cells will charge under a range of power supply; it is best if current supply is level, or the range between high and low is reduced to a steadier voltage output. To achieve a steadier supply; the generators should spin at a mostly steady speed so an automatic transmission using gears, belts or chains is introduced to connect the turbine to the generators and shift to the gear that is more suitable to keep the rotating speed of the generator relatively constant. For example, at 70 miles per hour vehicle speed, the gear driven by the fast spinning turbine may be connected to the generator through a gear of the same dimension; and if the speed of the vehicle is for example 40 mph the connection might be between the large gear of the turbine and a medium size gear that drives the generator thus raising the speed of the generator while the turbine is at low speed. At a 20-mph vehicle speed, the turbine will spin even slower, so the large gear of the turbine may be connected to the smaller gear that drives the generator and so on. Gears, pulleys or chains connections will have the same effect for speed of spin transition.

The first reason why most consumers do not use electric or hydrogen technology cars are that charging stations are far from each other, and even as stations will increase in major highways; country roads and most state roads will not have the facilities as frequently available. People don't like the idea of being stranded and whether this might not be true; the perception of the consumer is that it might happen and thus will not put himself at risk. Second reason of concern is the distance one can travel with a full charge; people like to go as far as possible with a full tank of gas and spend 5 minutes at a convenience store while they fill up their tanks and buy some food or drinks. People don't have the time to wait and unless recharging stations for electric cars are as frequent as gas stations, with as numerous pumps in each station; no consumer will accept the concept of an electric or hydrogen technology vehicle if the convenience and the speed of service are not there. In most highways; one can find in gas stations several pumps which serve a car every five minutes or an average of 12 vehicles per hour per pump. If each car however took 20 minutes to recharge the pump would be able to serve only three vehicles per hour. The station owner to keep his cashflow would have to charge four times more for charging an electric vehicle than refueling a standard gas or diesel vehicle or have 4 times more charging stations to accommodate the same number of consumers who would be passing through his fueling station.

The Airflow Power Generating Apparatus to be used for electric and hydrogen technology vehicles resolves the challenges mentioned above. With the apparatus on board the consumer will either never have to stop to charge batteries or fuel cells as they are constantly being recharged; or he may be able to recharge less often as his distance of travel would have been significantly increased. There isn't a more reliable energy source than air flow power on a moving vehicle

SUMMARY OF INVENTION

The present invention consists of one or a plurality of air flow turbines installed in electric, hybrid or hydrogen technology vehicles to generate electrical current to charge batteries or fuel cells while the vehicle is in motion. This apparatus may be installed in multiple types of vehicles such as ships, boats, trucks, busses and any other type of vehicle. This invention is not limited to over land vehicles.

The turbines may be installed on vehicle rooftops, sides or bottoms. FIGS. 16 through 21. Air flow capture may be through funnels (7) or air flow openings (27) which may be positioned by vehicle designers to optimize air flow power driving the turbines in their models. The figures on this application show as a mode of illustration only; some possible locations and apparatus variations to provide air flow power to electric and hydrogen technology vehicles in a variety of vehicles types.

DETAILED DESCRIPTION OF THE PREFERRED EMBODIMENTS

The present invention installed in an electric or hydrogen technology vehicle captures air flow through an optional capturing funnel (7) or air flow opening (27) and directs it to a turbine (10) with cups (25), concave elongated vanes (9) or blades (22) on a single or a plurality of drums or converter wheels, which rotate with the rapid air flow. The air will flow through the inlet opening at approximately the same speed being travelled by a moving vehicle. Air flow speed may be further enhanced by the installation of the funnel (7), which with a greater area of air flow capture, in relationship to the smaller area at the opposite side of the funnel, will increment air flow speed through the airflow cavity (4) as per the Venturi principle. The air flow passing through the smaller opening will have a jet stream effect hitting the cups (25), blades (22), or concave elongated vanes (9) of the turbine (10) which will rotate at a greater speed. Air flow then exits freely through the opposite end of the air flow cavity (4) where an optional airflow diffuser (14) may be installed to reduce whistling that may be produced by fast exiting air flow.

The turbine (10) or plurality of turbines rotate a shaft (3) at its center which supports the converter wheels (25) or drums. The shaft (3) may be connected directly to generators attached to the shaft (3), or may be connected to gears (20), chains or pulleys to further increase the speed of rotation of the generators (17). The generators in turn produce DC current which is used to charge the batteries, fuel cells or the like of the vehicle. Voltage will be controlled by regulators or other systems which are components of the vehicle.

The cups (25), blades (22) or concave elongated vanes (9), drums or converter wheels may be constructed or light weight non-corrosive metals or alloys; some plastics may be an alternative if weight and resistance to bending or warping is equivalent to metal such as coated aluminum which is the preferred material for the turbine. The drums are rigid and hollow thus making them lighter. Components of the Airflow Power Apparatus must be non-corrosive and resistant to oxidation. The Airflow Power Apparatus will be subject to extreme cold and hot weather conditions as well as dry and wet environments. For vehicles traveling in coastal areas, extreme care must be used on selecting materials that will resist salt air.

The air flow funnel (7) or airflow opening (27) includes a grill (8) for preventing large objects to go through. The openings in the grill are large enough to allow for small leaves to pass by, larger pieces of debris could interfere with the rotation of the turbine. The grille (8) is designed to prevent large objects such large size leaves to remain stuck to the grill and reduce airflow passage. Turbine rotation and cleanliness of the turbine cavity is achieved by pumping water with anti-freeze into the cavity (12) through a hose/tube connection fitting (11) and sprayed into the turbine cavity through spray nozzles (13). A small on board electric pump activated by the user from the interior of the vehicle is used on demand. Water exits the turbine cavity through drain (6) at the lower area of the turbine cavity and it can be recycled after filtering the fluid. In wet conditions, water entering the air flow cavity from the exterior will also find its way out through the drain. Considering that the space between the turbine (10) and the turbine cavity is millimetric; only a small amount of dirt will be accumulated and then washed clean by the fluid from the spray nozzles (13). Larger grains of dusts, bugs, mud, etc. will be ejected by the turbine through the exiting air flow cavity.

As the turbines will also operate in temperatures and environments which are subject to freezing temperatures, snow and ice, the turbine casing (1) is heated automatically when these conditions are present. The temperature of the casing (1) is controlled by a thermostat (22) which activates heating elements (2) thus de-icing snow or freezing water that otherwise may block the air flow cavity (4) or prevent the turbine (10) from spinning. When the vehicle starts in freezing conditions; it will initially run on its batteries or fuel cells which at the time would have been charged by previous travel; these will start the deicing process allowing the turbines (10) to start once conditions are stable.

The Airflow Power Generating Apparatus to be used in electric and hydrogen technology vehicles may be installed on vehicle roof tops, sides or bottoms and configurations may widely vary from one vehicle to another FIF 16 (26), FIG. 17 (27) FIG. 19 (28), thus the drawings in this application also include embodiments of the apparatus illustrated in varying positions and locations; these are demonstrative but are not intended to be limitative in any way. The shape of the capturing funnel (7), air flow opening (27) and the apparatus itself may be modified as these are incorporated in different vehicles types, styles, models and designs; however, the components of air capture, airflow cavity, turbine, generator, deicing and wash systems are integral and intrinsic parts of this invention regardless of the shape these may take to serve the overall design of the vehicle. Air flow capture may be through existing type of vent grills or through new air flow cavities which may be created by vehicle designers to optimize the air flow under their specific conditions and parameters. The figures include different vehicle types, cars, trucks, vans and trailers with the apparatus incorporated, however these are not limitative and are for illustration only.

Trailers (31) hauled by trucks may have a fixed or removable apparatus attached or installed, thus being able to generate additional air flow power to recharge batteries or fuel cells of the truck to compensate for the added load and for the increased battery or fuel cell demand. Achieving balance among battery or fuel cell energy loss with airflow power energy charge, will allow manufacturers of vehicles to eliminate fossil fuel engines and all their components and ancillary parts; this reduction of significant weight and space will result for example in trucks and other vehicles to be lighter and with more space to place batteries or fuel cells making them a strong competitor of the fossil fuel engine counterparts with the significant advantage of producing their own fuel as they travel.

DESCRIPTION OF THE FIGURES

FIG. 25. Is a listing of some of the permanent magnet synchronous generators designed for use with the crossflow turbines of lower RPM requirements, the rated output power in KW, the starting torque requirements, and the voltage output.

FIG. 38. Further displays values of air resistance on the front of a trailer and how air resistance is reduced after Apparatuses' funnels are positioned in the same locations. Airflow exit openings are also shown where exhaust airflow would be subjected to the chimney affect by the air flowing along the exterior surface of the vehicle. The chimney effect will further reduce air resistance by creating a vacuum at the exit opening.

FIG. 44. Displays the installation of apparatuses at the front and rear of a trailer. Apparatuses at the rear convert tail resistance into usable airflow to drive apparatuses that convert kinetic force to electrical energy. Figure shows this to be another location suitable for the installation of apparatuses.

Figure 1:
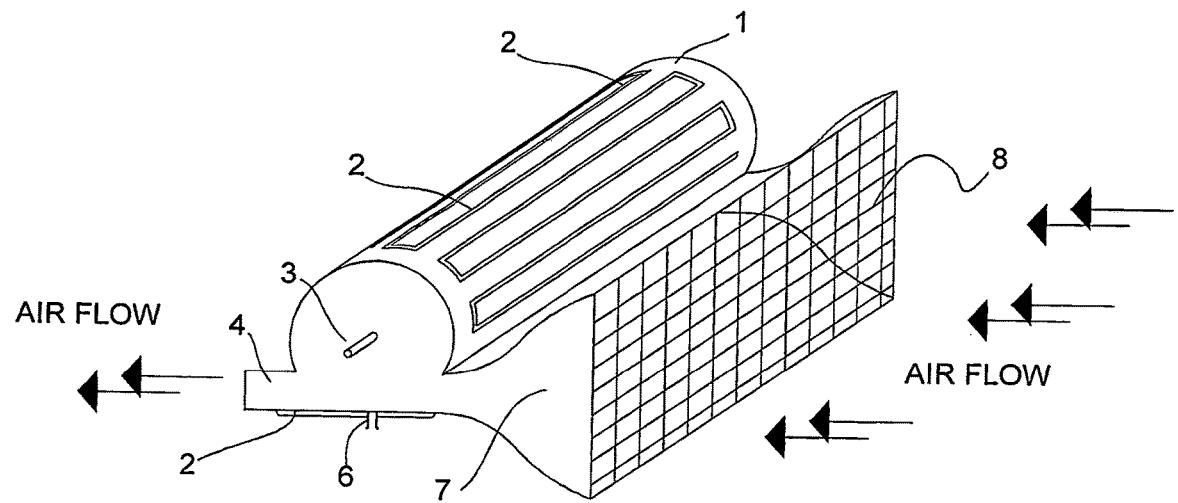
FIG. 1. Is an isometric view of the Air Flow Power Generating Apparatus where (1) is the apparatus casing, (2) heating elements, (3) shaft, (4) airflow cavity, (6) drain, (7) Funnel and (8) grill.
Figure 2:
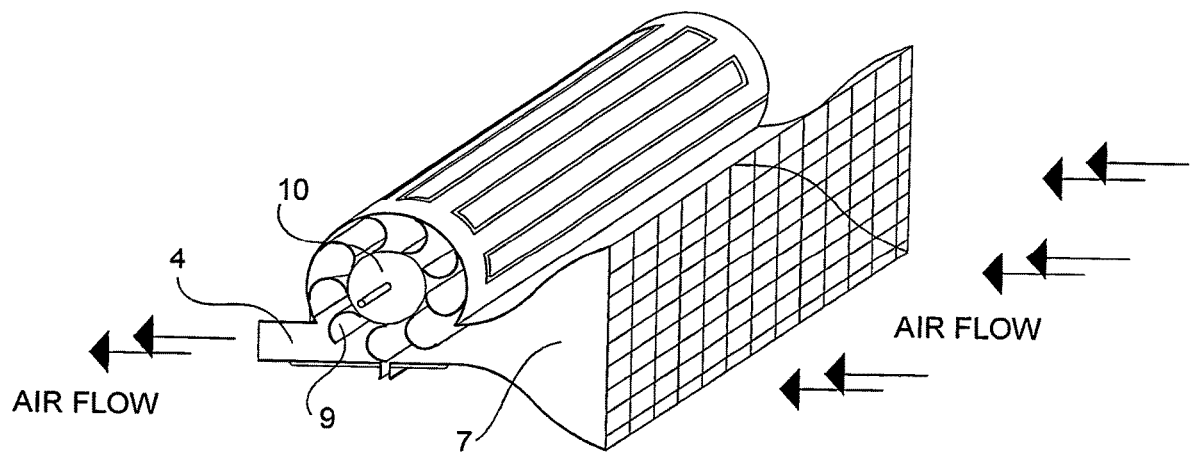
FIG. 2. Is an isometric view of a section cut of the Air Flow Power Generating Apparatus where (4) is airflow cavity, (7) is funnel, (9) are elongated vanes and (10) is the drum turbine.
Figure 3:
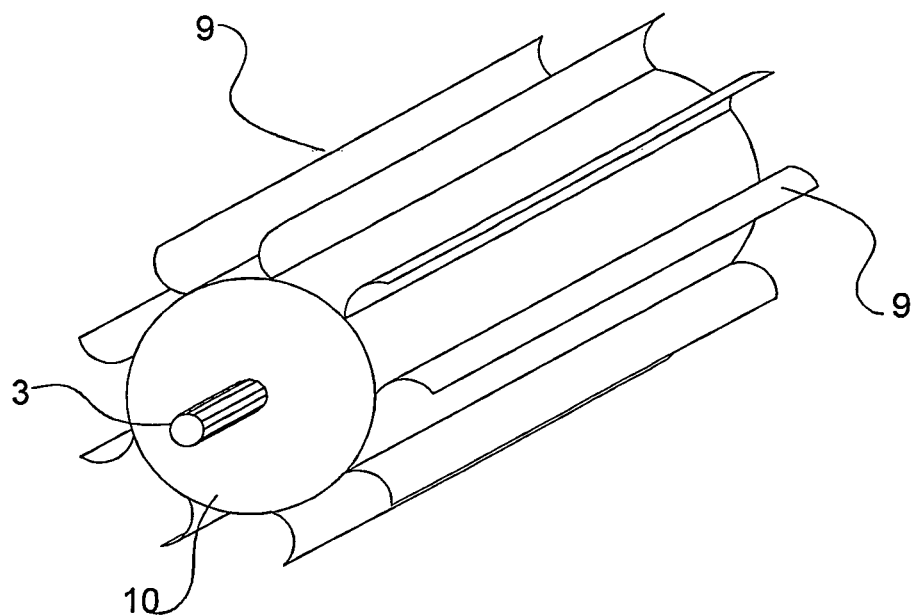
FIG. 3. Is an isometric view of the drum turbine where (3) is the shaft, (9) are the elongated vanes and (10) is the drum turbine.
Figure 4:
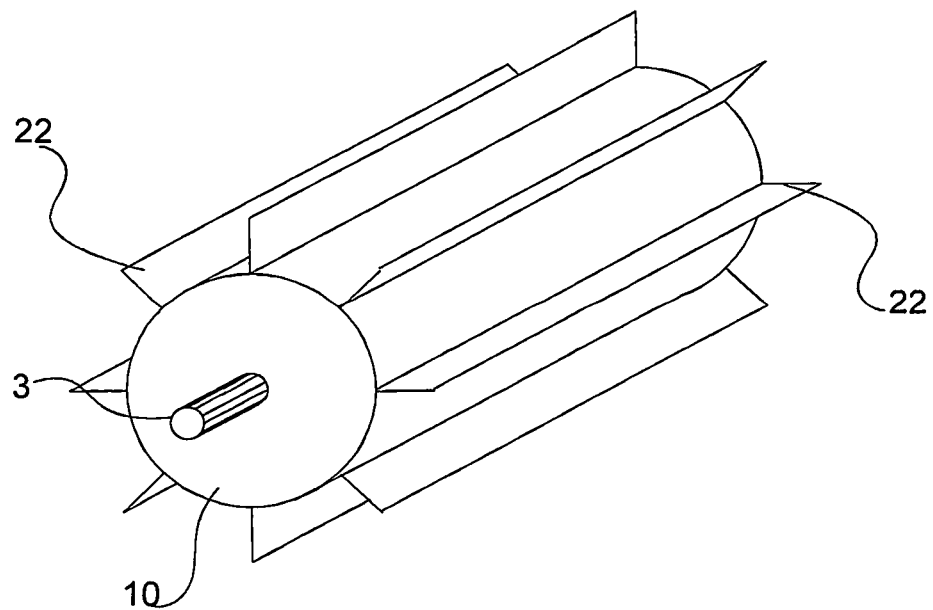
FIG. 4. Is an isometric view of a drum turbine (10) where blades (22) are used instead of elongated vanes and (3) is the shaft of the turbine.
Figure 5:
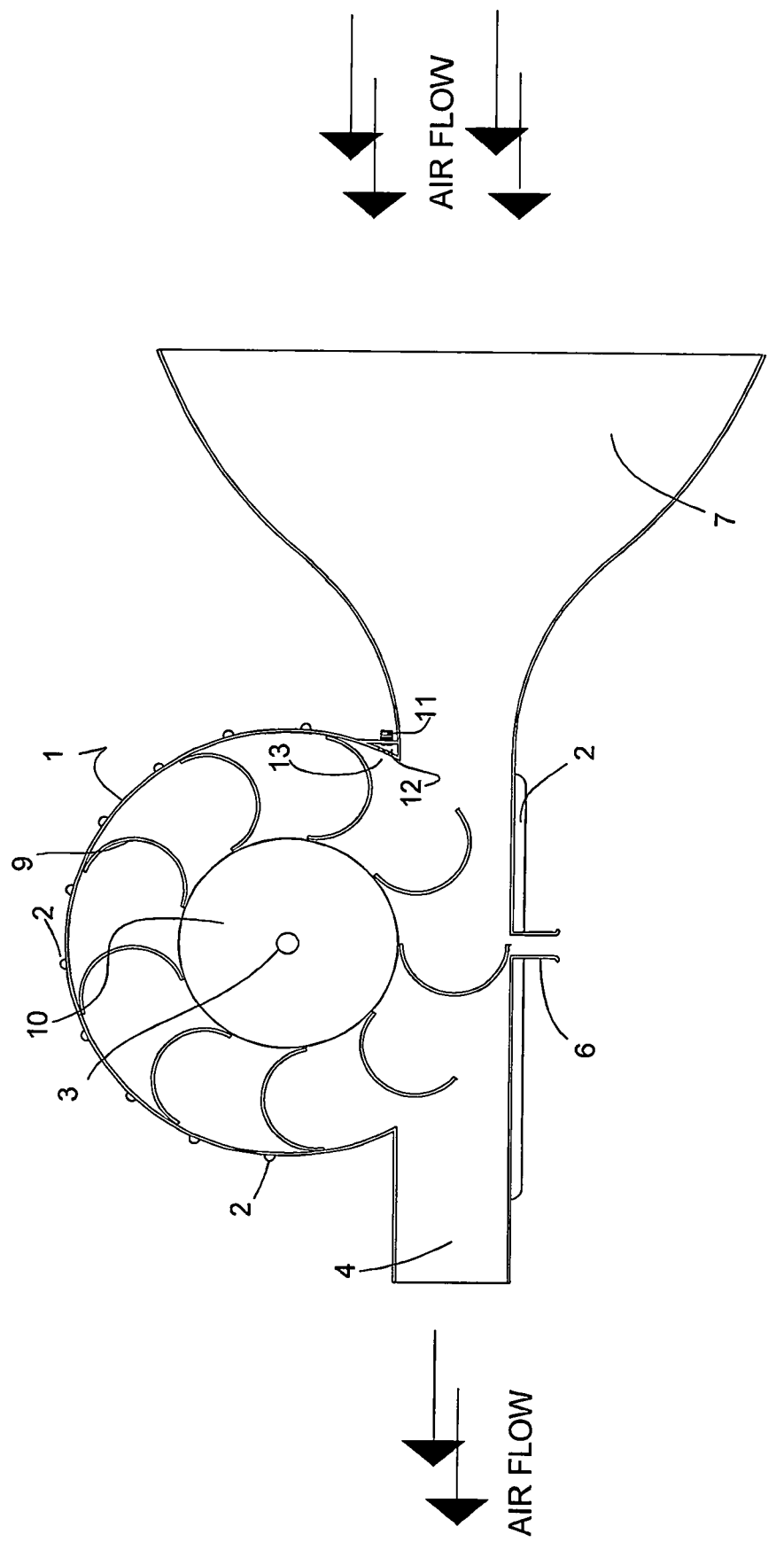
FIG. 5. Is a section of the Air Flow Power Generating Apparatus depicted in FIGS. 1 and 2 where (1) is the turbine casing, (2) the heating elements, (3) the shaft, (4) the airflow cavity, (6) the apparatus drain, (7) the funnel, (9) the elongated vanes, (10) the turbine, (11) the fitting for attachment of a hose or tube connected to vessel and a pump for delivery of water mixed with antifreeze, (12) is a chamber into which water mixed with antifreeze will be pumped to be sprayed into the turbine casing by nozzles (13) with the purpose of washing away dirt and cleaning the turbine (10) and (1) the turbine casing.
Figure 6:
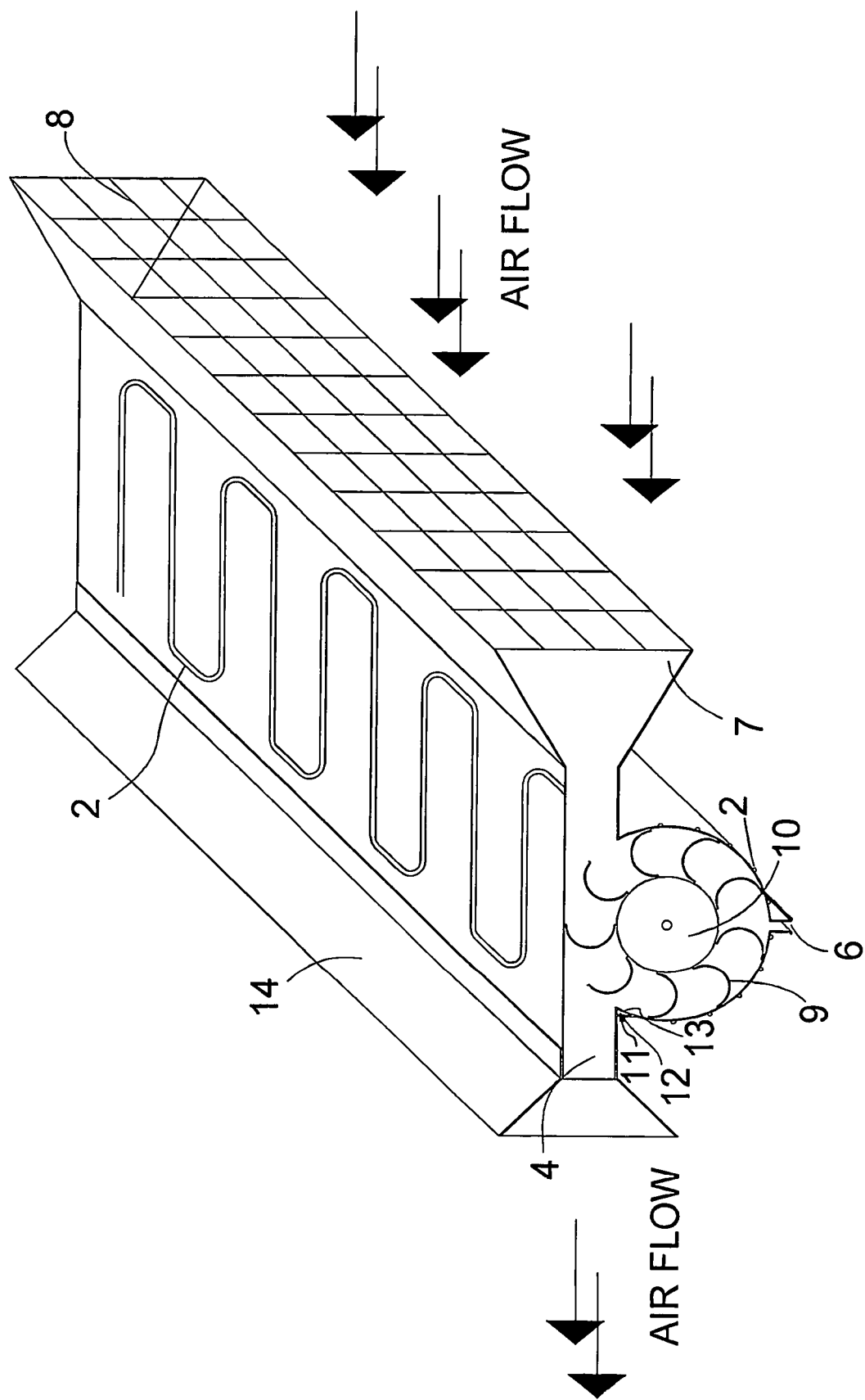
FIG. 6. Is an isometric section cut of an Airflow Power Generating Apparatus with a configuration where the turbine (10) is located in the underside of the unit. This figure demonstrates the flexibility in design which may be altered into multiple versions further discussed and based on vehicle designs, models and functionality. Drawing depicts (2) heating elements, (4) airflow cavity, (6) turbine casing drain, (7) funnel, (10) drum turbine, (11) the fitting for attachment of a hose or tube connected to vessel and a pump for delivery of water mixed with antifreeze, (12) is a chamber into which water mixed with antifreeze will be pumped to be sprayed into the turbine casing by nozzles (13) with the purpose of washing away dirt and cleaning the turbine and the turbine casing, and (14) an airflow diffuser which may be used to reduce any airflow noise that may come from the airflow cavity.
Figure 7:
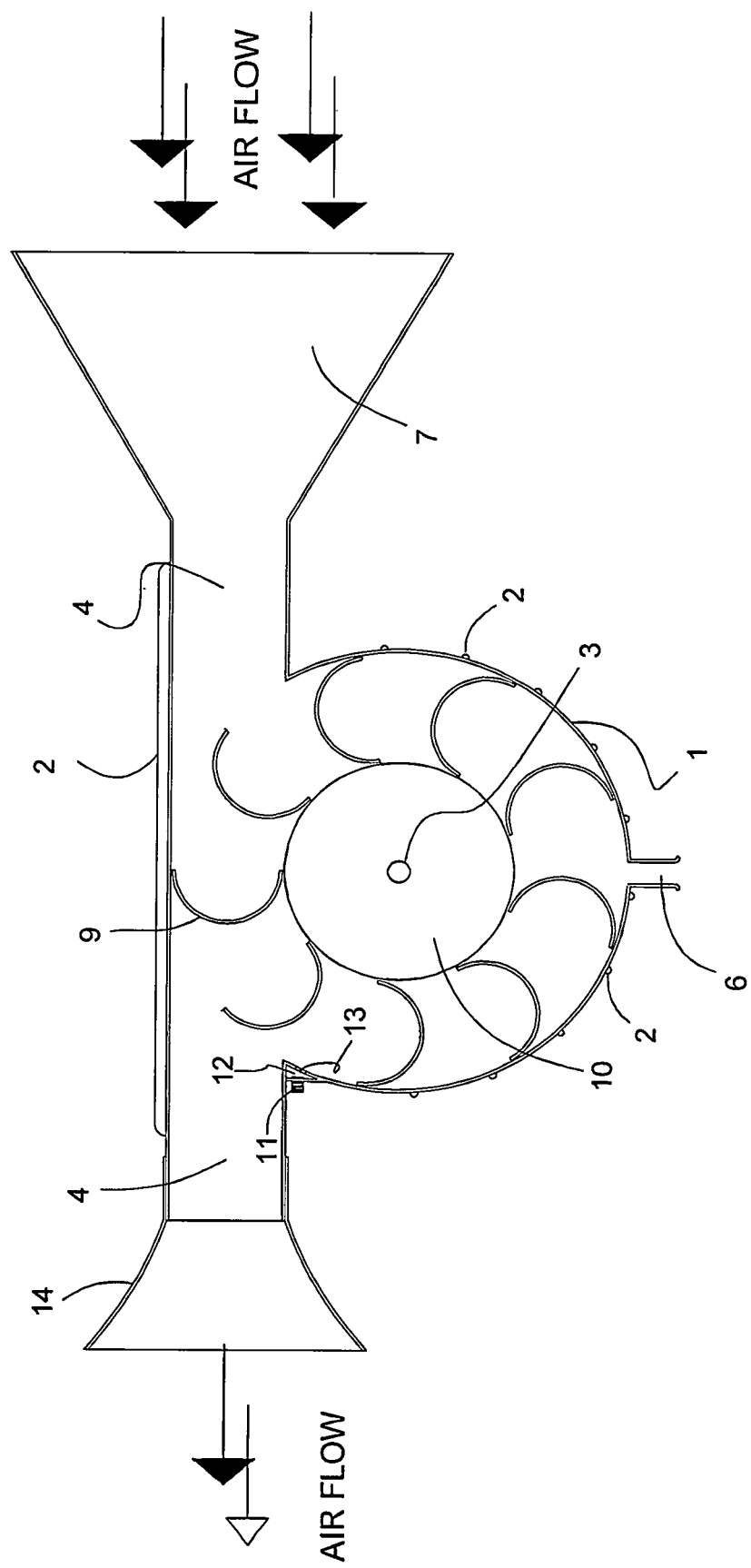
FIG. 7. Is a section of the Airflow Power Generating Apparatus depicted in FIG. (6)
Figure 8:
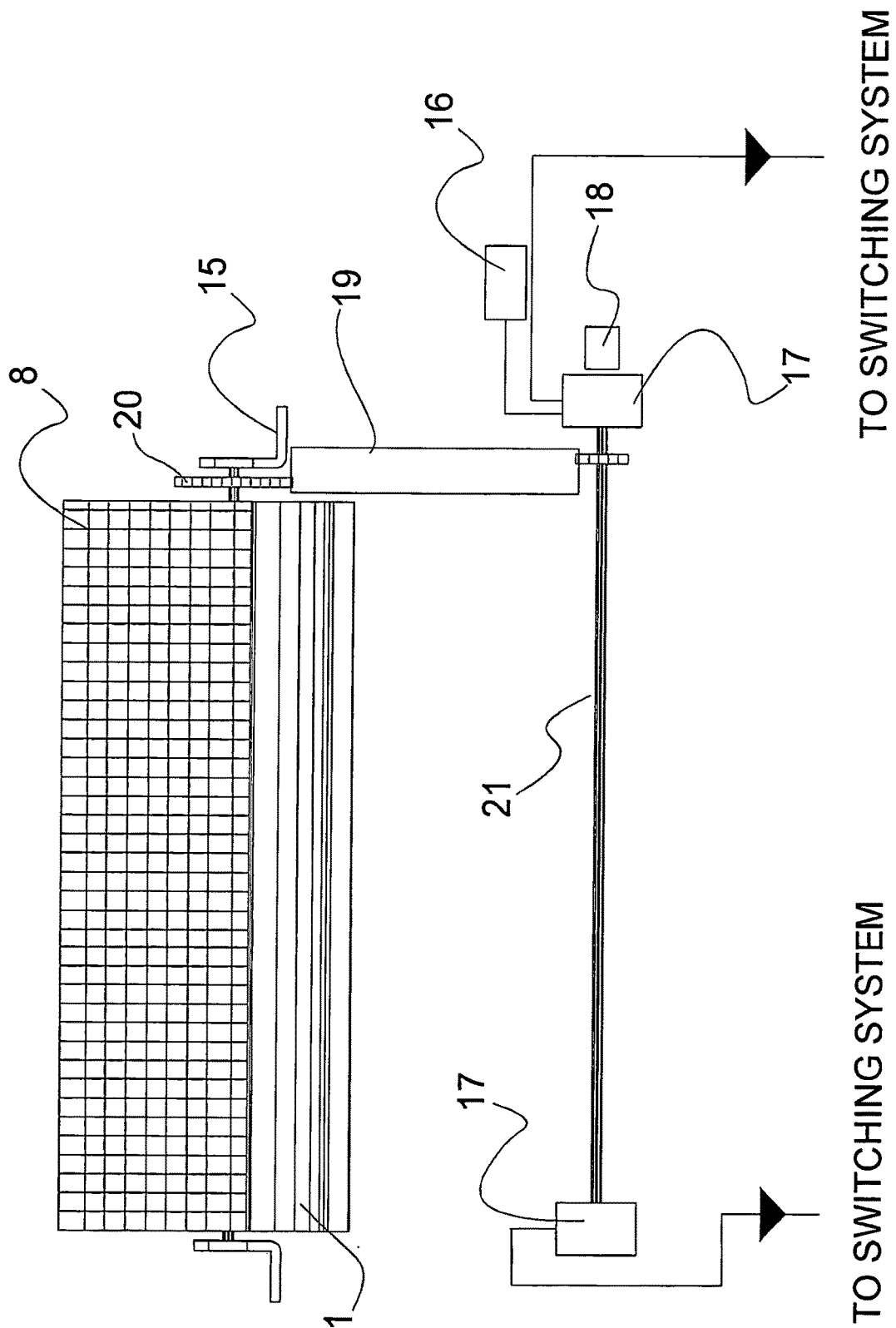
FIG. 8. Depicts the Airflow Power Generating Apparatus and other components vital for the apparatus to transform airflow power to kinetic energy and to electrical DC current for recharging the batteries or fuel cells. In the figure are depicted (1) the turbine casing, (15) the apparatus support, (20) a gear or pulley to drive an automatic transmission (19) intended to shift gears as necessary to maintain the rotation of the generators (17) at a stable rotation speed. An inverse tachometer (16) will control the speed of the turbine be used to rotate several generators in tandem; these generators are interconnected, thus doubling the DC current every time a generator (17) is added to the series chain.
Figure 9:
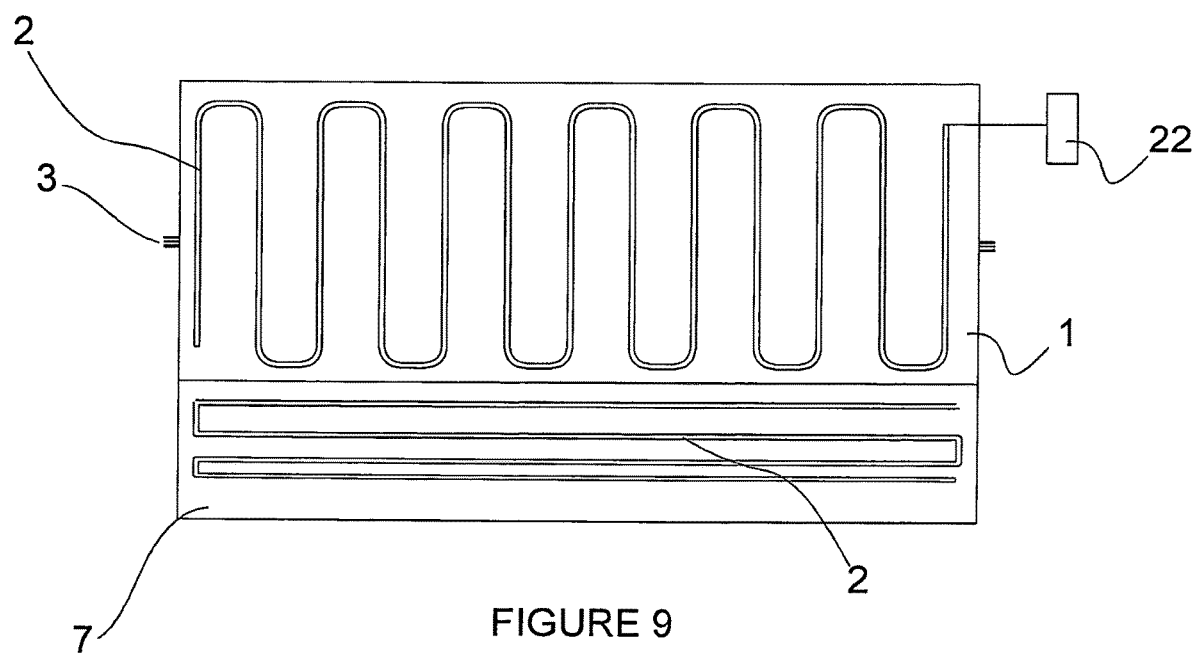
FIG. 9. Is a top view of the Airflow Power Generating Apparatus depicted in FIG. 8, where (1) is the turbine casing, (2) are heating elements, (3) turbine shaft, (7) funnel and (22) a thermostat to control the temperature of the heating elements.
Figure 10:
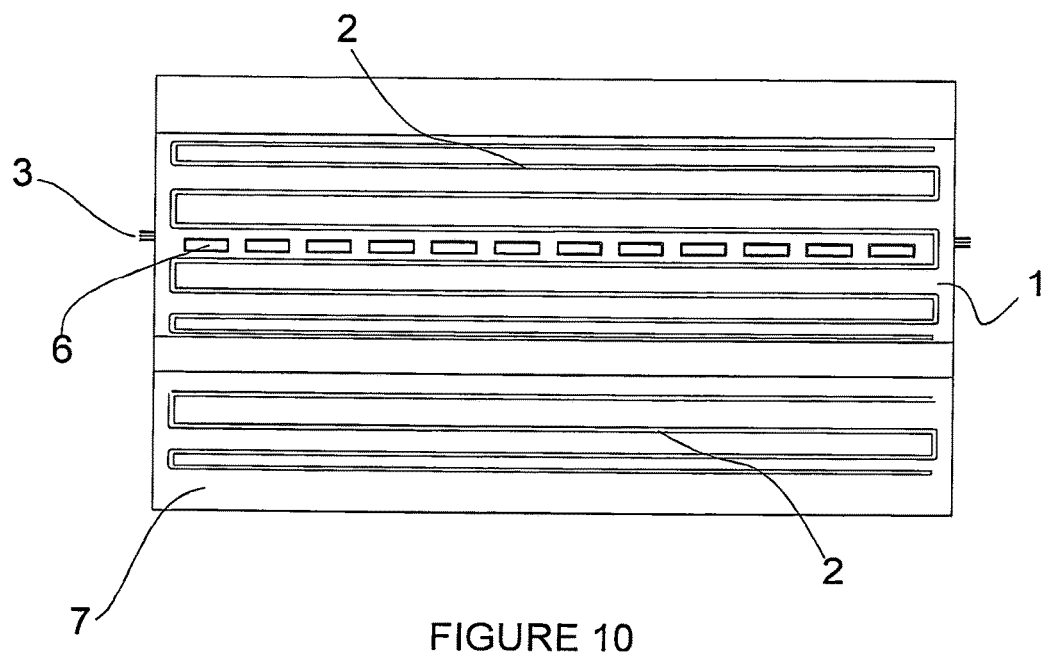
FIG. 10. Is a reflected bottom view of the Airflow Power Generating Apparatus depicting (1) turbine casing, (2) heating elements, (3) turbine shaft and (6) turbine casing drains.
Figure 11:
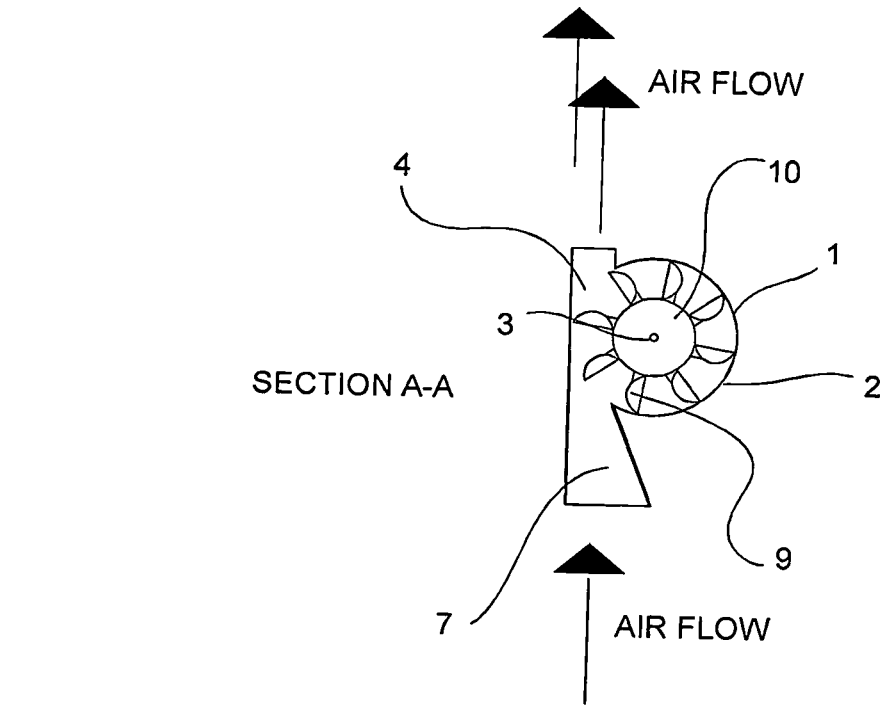
FIG. 11. Is a cross section view of an Airflow Power Generating Apparatus in a vertical position for use in similar cases like those depicted in FIG. 16 (26) and FIG. 17 (26). This section cut of the apparatus shown in FIG. 11; depicts (1) a turbine casing, (2) heating elements, (3) turbine shaft, (4) airflow cavity, (9) elongated vanes, (10 drum turbine, (27) airflow opening.
Figure 12:
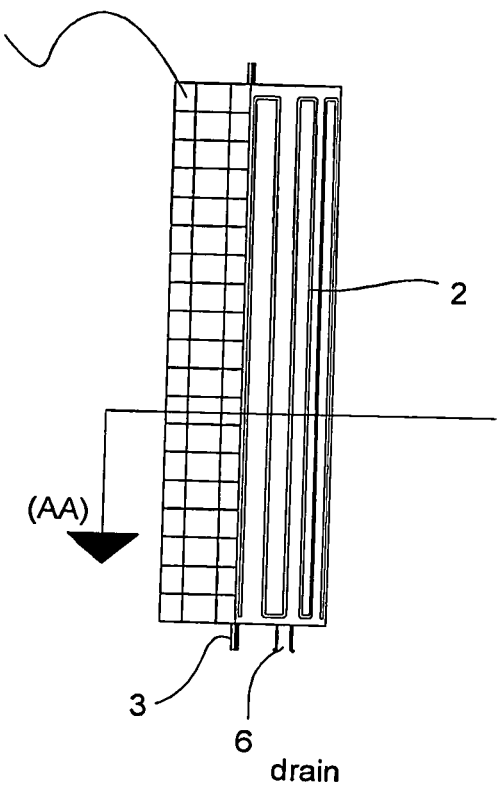
FIG. 12. Is a front view of an Airflow Power Generating Apparatus in vertical position for use in cases like those depicted in FIG. 16 (26) and FIG. 17 (26). The figure depicts; (2) heating elements, (3) turbine shaft, (6) turbine casing drains and (8) a grill.
Figure 13:
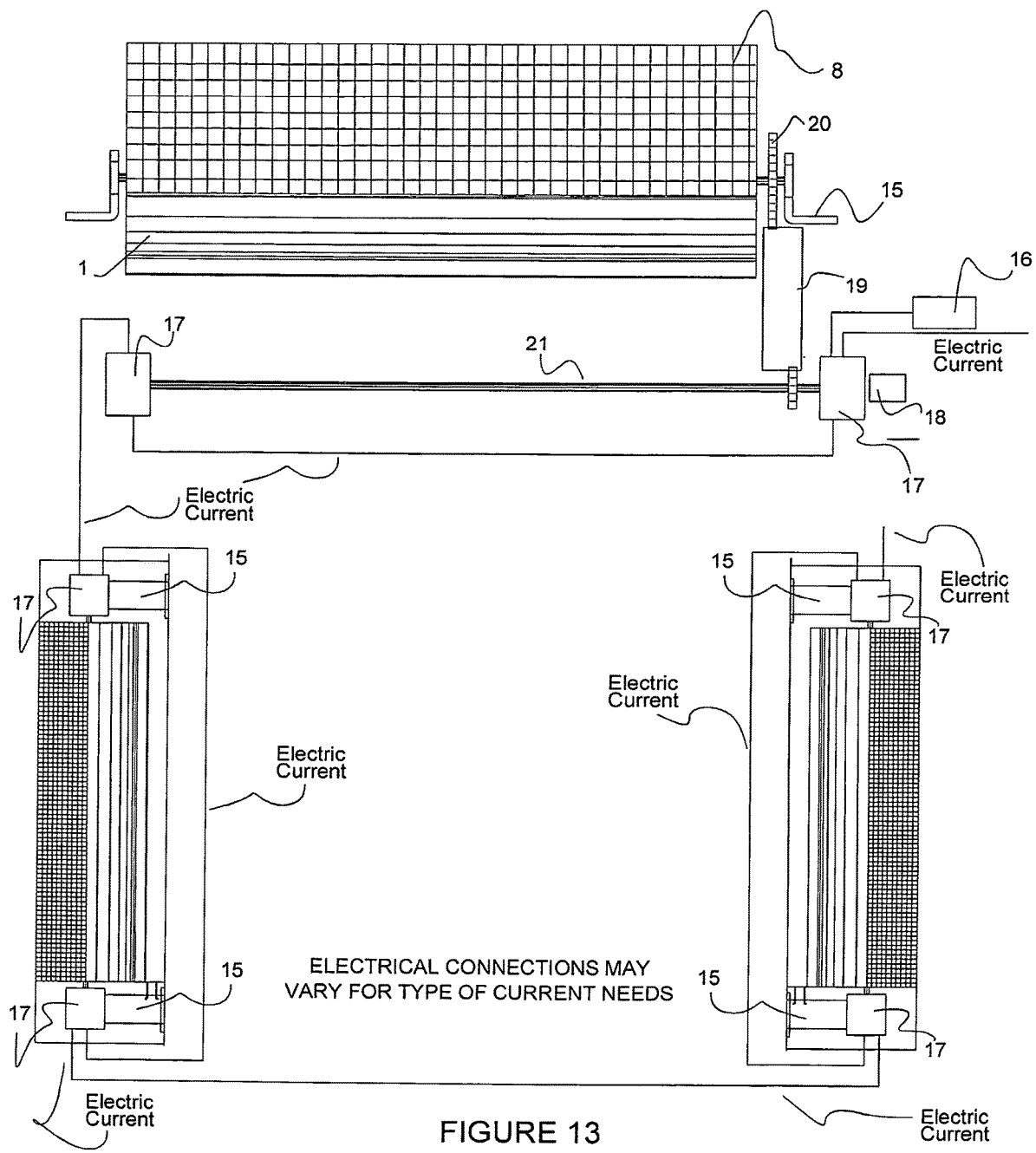
FIG. 13. Depicts a possible configuration of a combination of the systems depicted in FIG. 8 and FIG. 12 where multiple system configurations are combined, and generators are connected in series to further increase the DC voltage for charging batteries or fuel cells.
Figure 14:
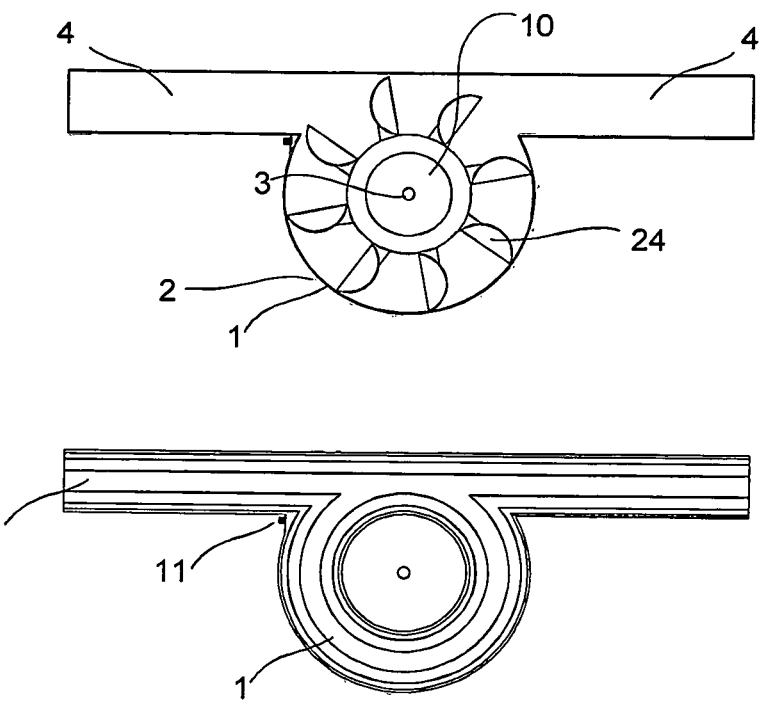
FIG. 14. Depicts a version of the Airflow Power Generating Apparatus for use in shallow environments. The unit due to size and air flow capture capability may be used in smaller vehicles. This turbine apparatus is of tubular air flow cavity with components comparable to the larger systems depicted in previous figures and labeled as such, followed by the letter A for ease of interpretation. Because of its shape, capacity, and airflow capability; cups are used on a converter wheel which in turn will spin a generator (17.)
Figure 15:
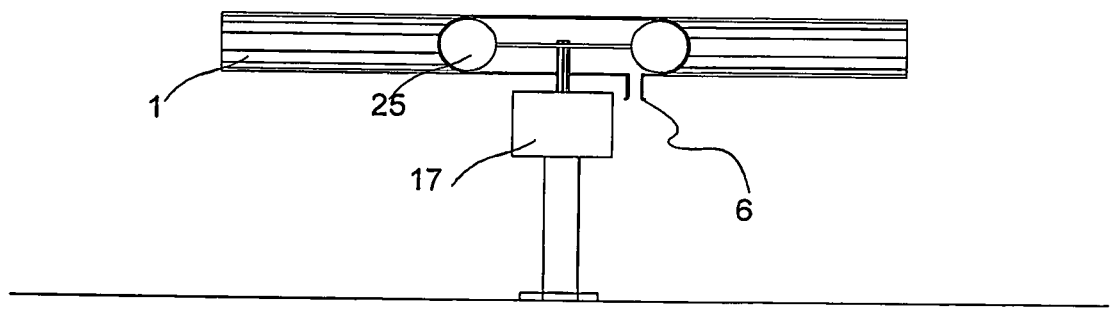
Figure 16:
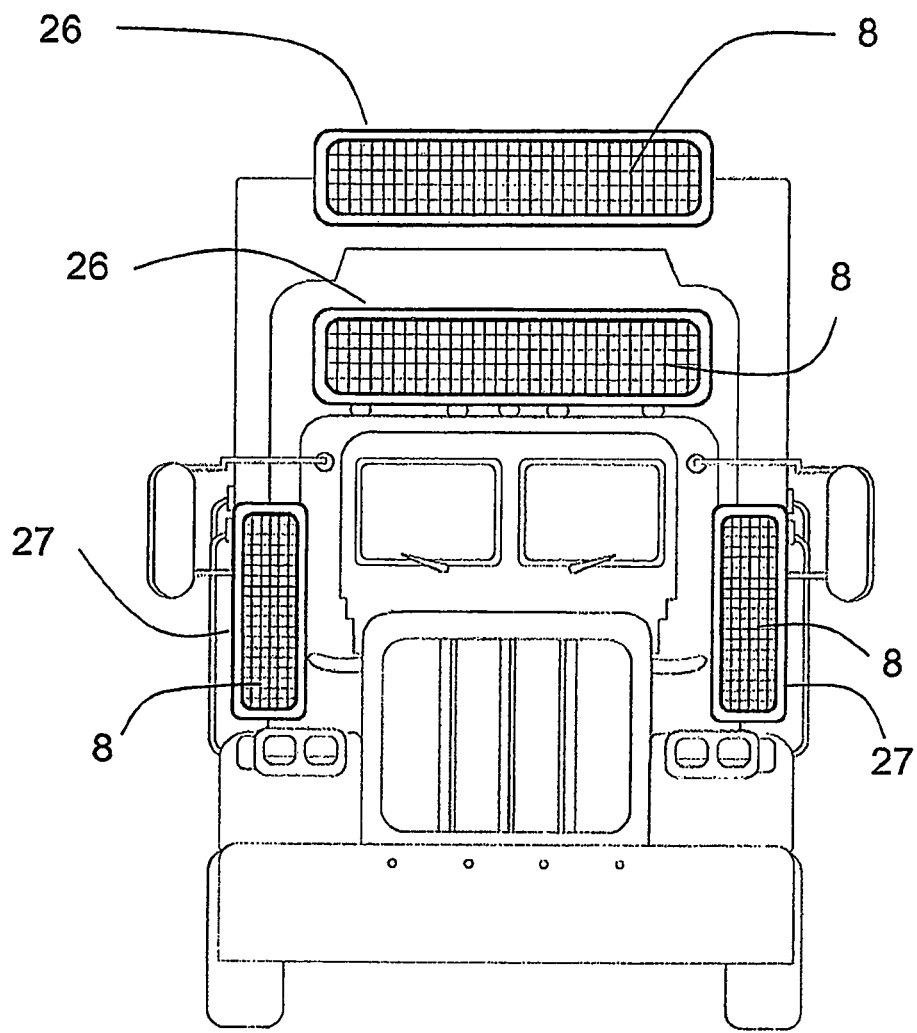
FIGS. 16 through 21. Depict a number of vehicles where Airflow Power Generating Apparatuses are shown as examples of vehicle types and apparatus location which may vary as determined by vehicle designers selecting areas beneficial for airflow capture.
Figure 17:
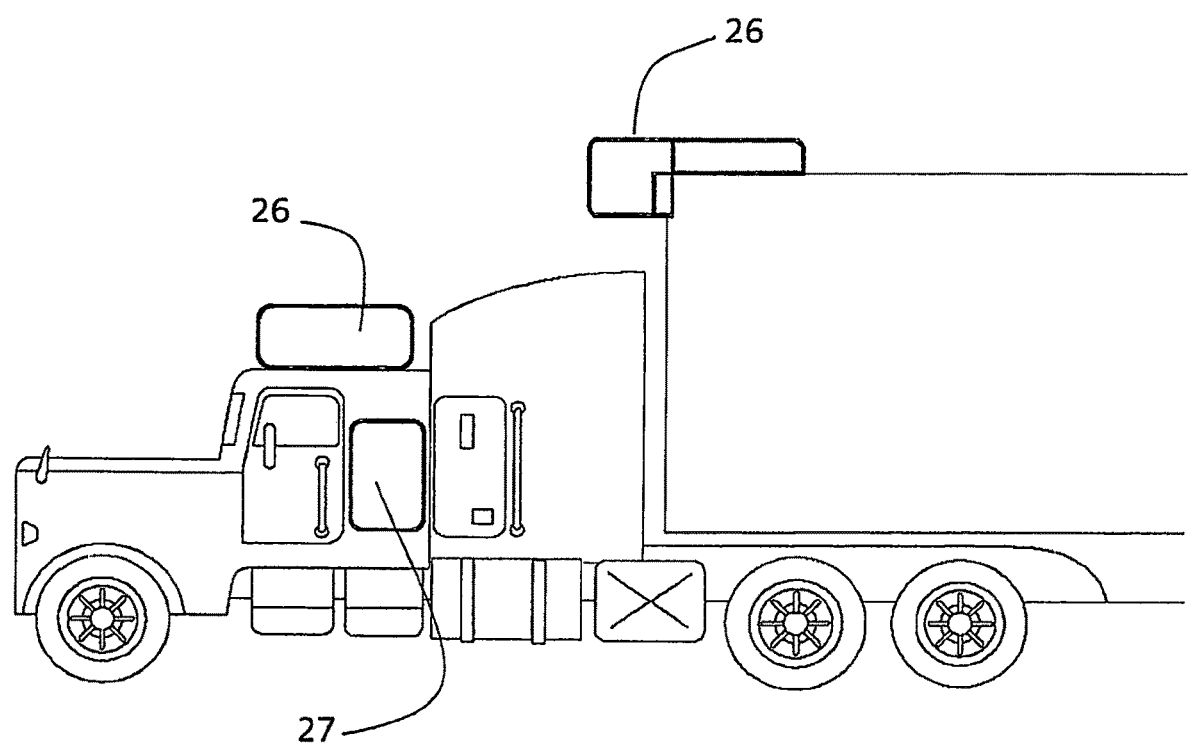
Figure 18:
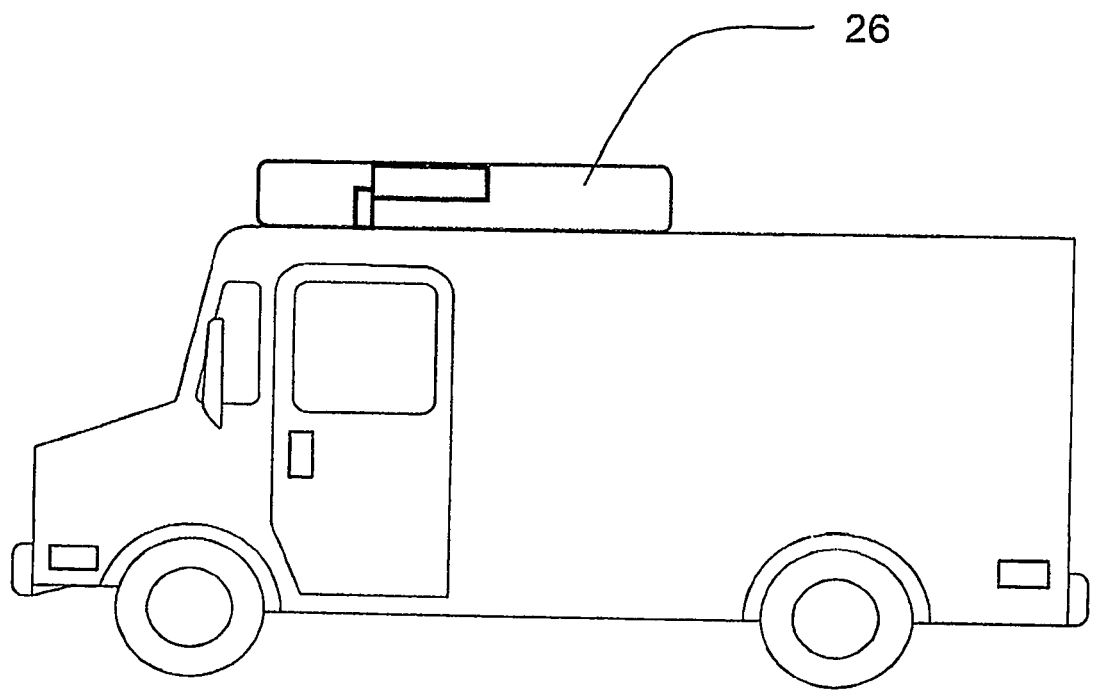
Figure 19:
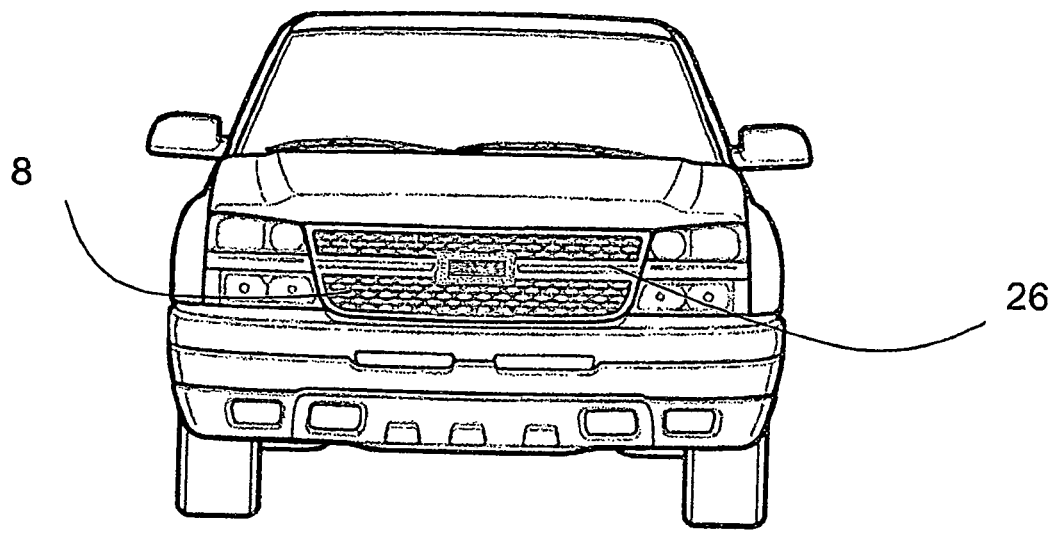
Figure 20:
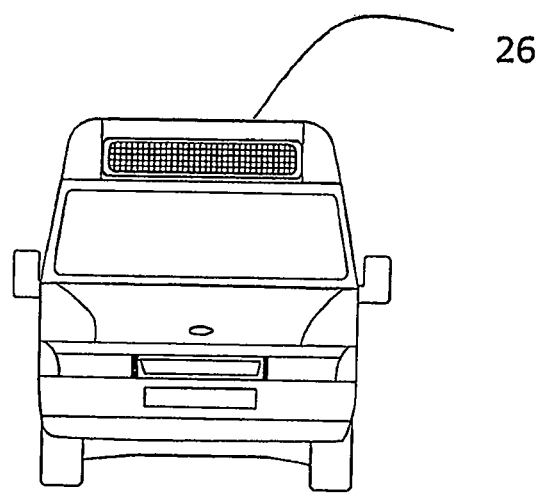
Figure 21:
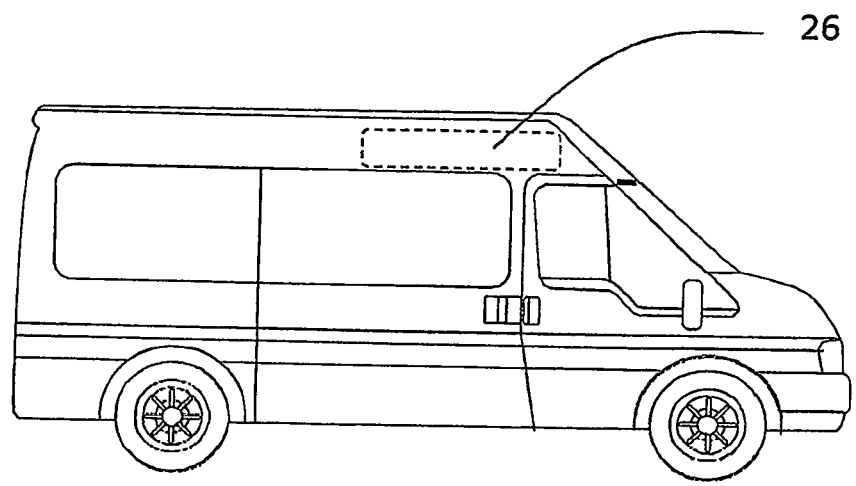
Figure 22:
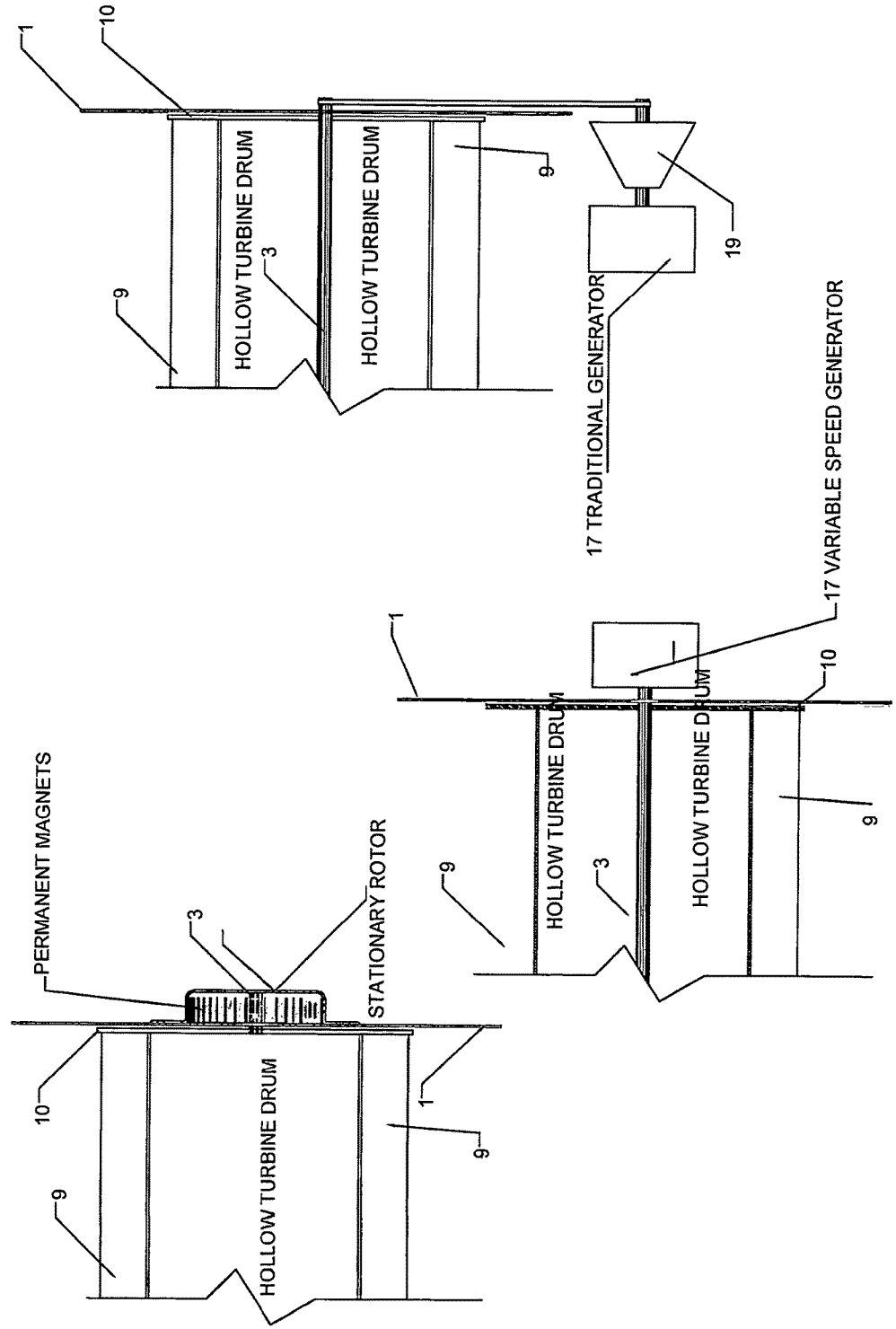
FIG. 22. Displays three scenarios of embodiments with use of traditional, inverter or variable speed generator and permanent magnet synchronous generator most used in turbine systems.
Figure 23:
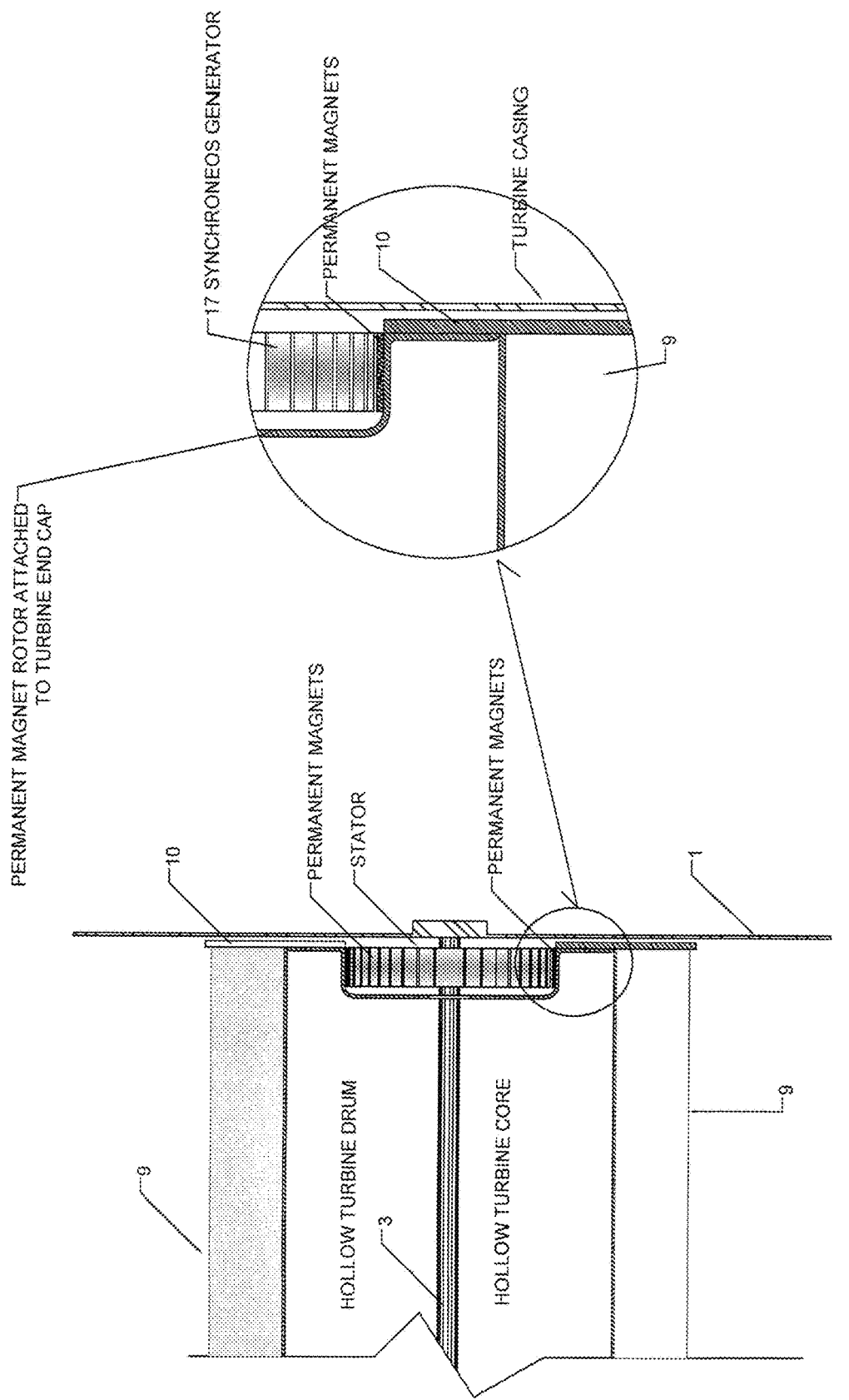
FIG. 23. Section view and detail of permanent magnet rotor coupled to the interior of the turbine hollow and rigid turbine drum.
Figure 24:
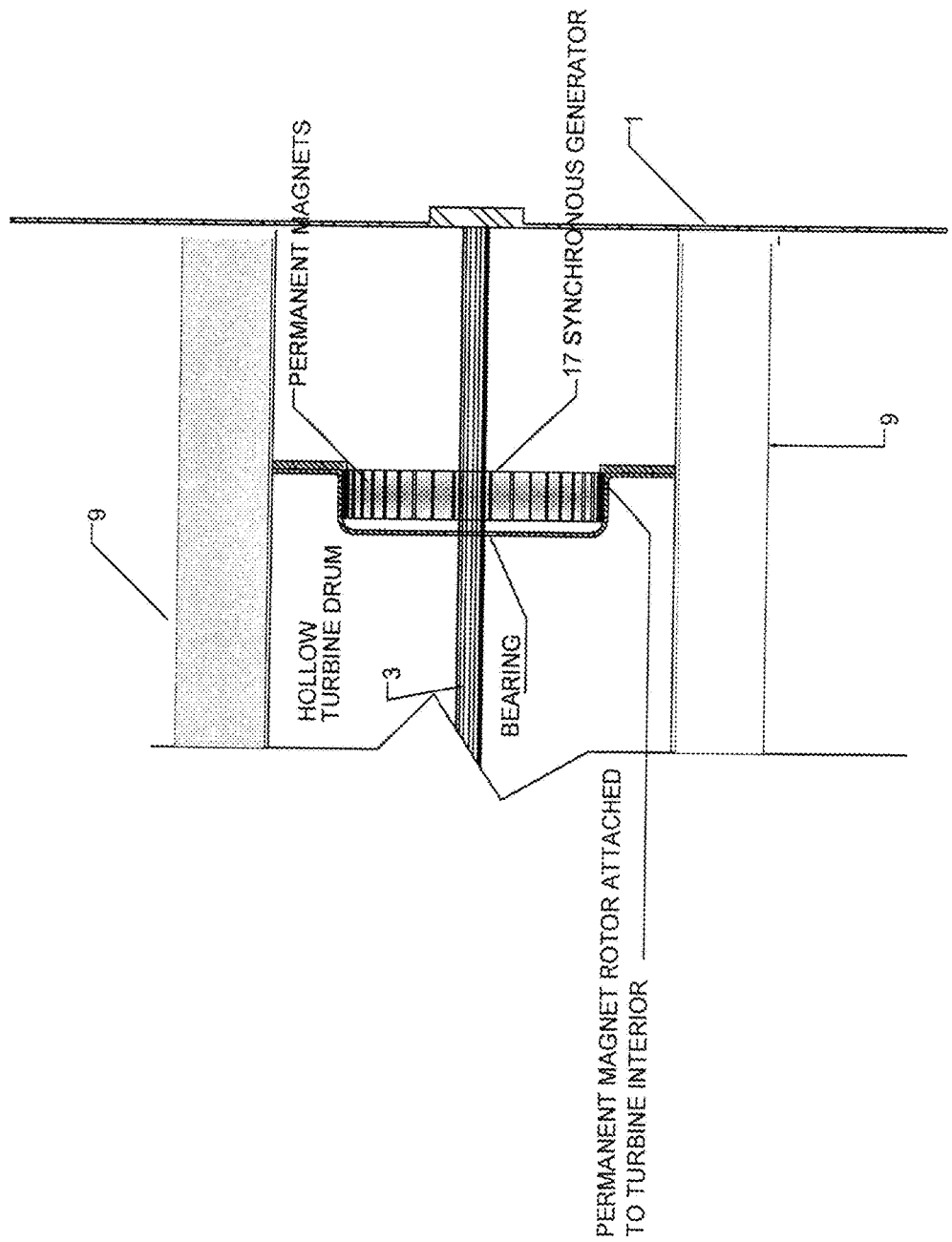
FIG. 24. Section view of a crossflow turbine with permanent magnets coupled to the turbine shaft inside the cavity of the hollow and rigid turbine drum. In this embodiment the generator may be fully inserted into the hollow drum providing the condition for the turbine to extend the full width of the space allocated for the apparatus.
Figure 26:
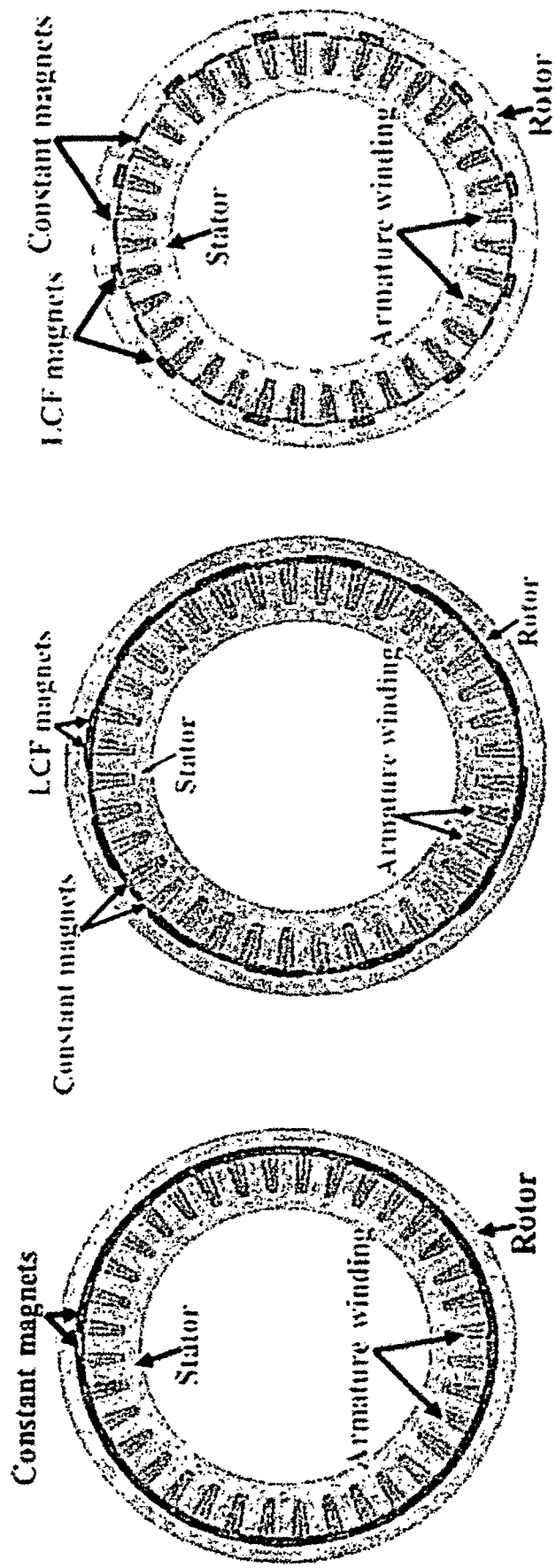
FIG. 26. Displays section views of positioning of the constant magnets inside the turbine; these may be coupled to the interior wall of the turbine hollow drum or to the turbine shaft and may be used to couple to a synchronous generator stator to generate electricity.
Figure 27:
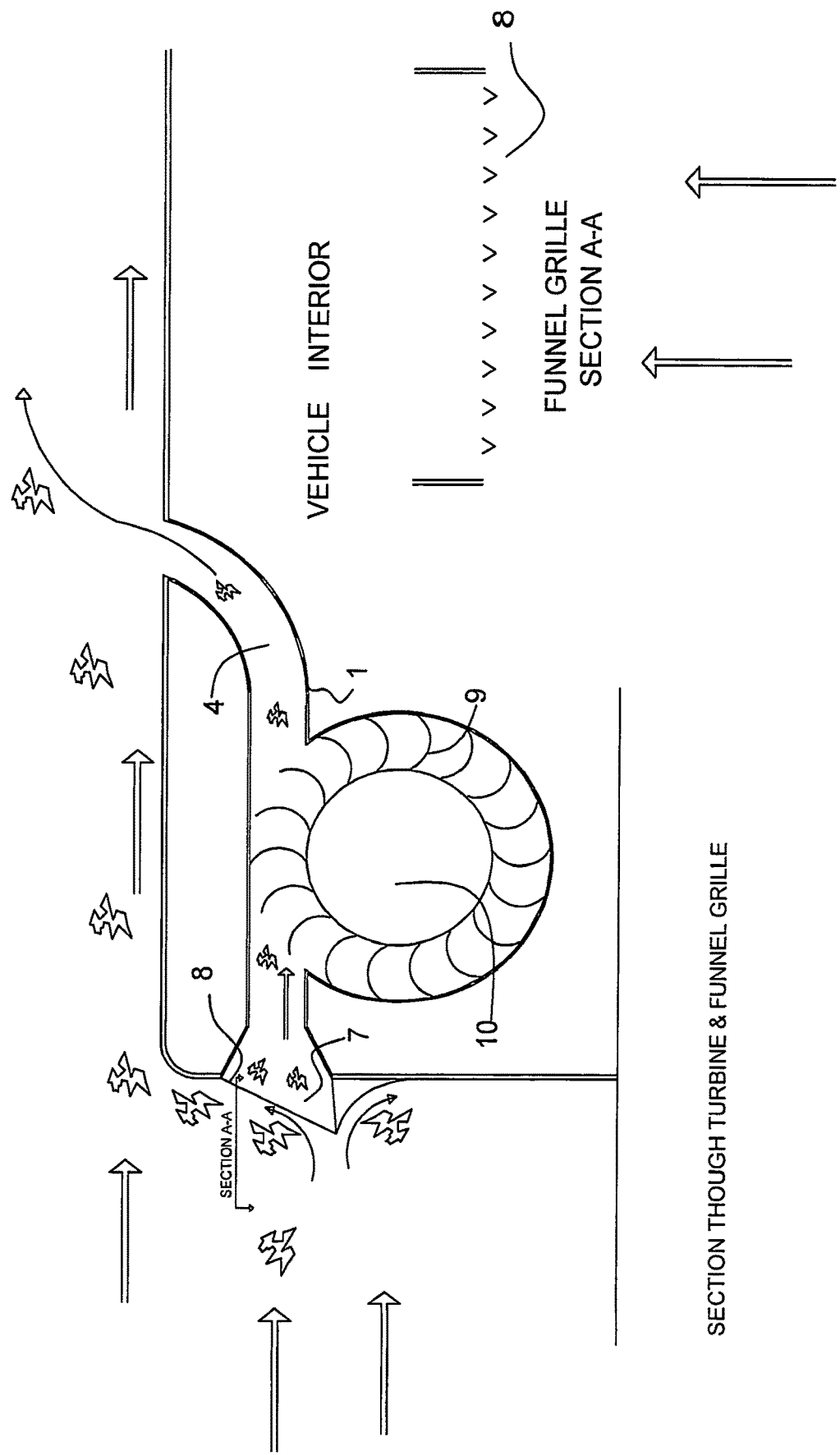
FIG. 27. Displays a section of the apparatus installed inside a trailer, the position and design of the capturing funnel as described pushes away larger debris letting smaller pieces of debris to enter the airflow cavity where they are ejected by the spin of the turbine, centrifugal force, and speeding airflow.
Figure 28:
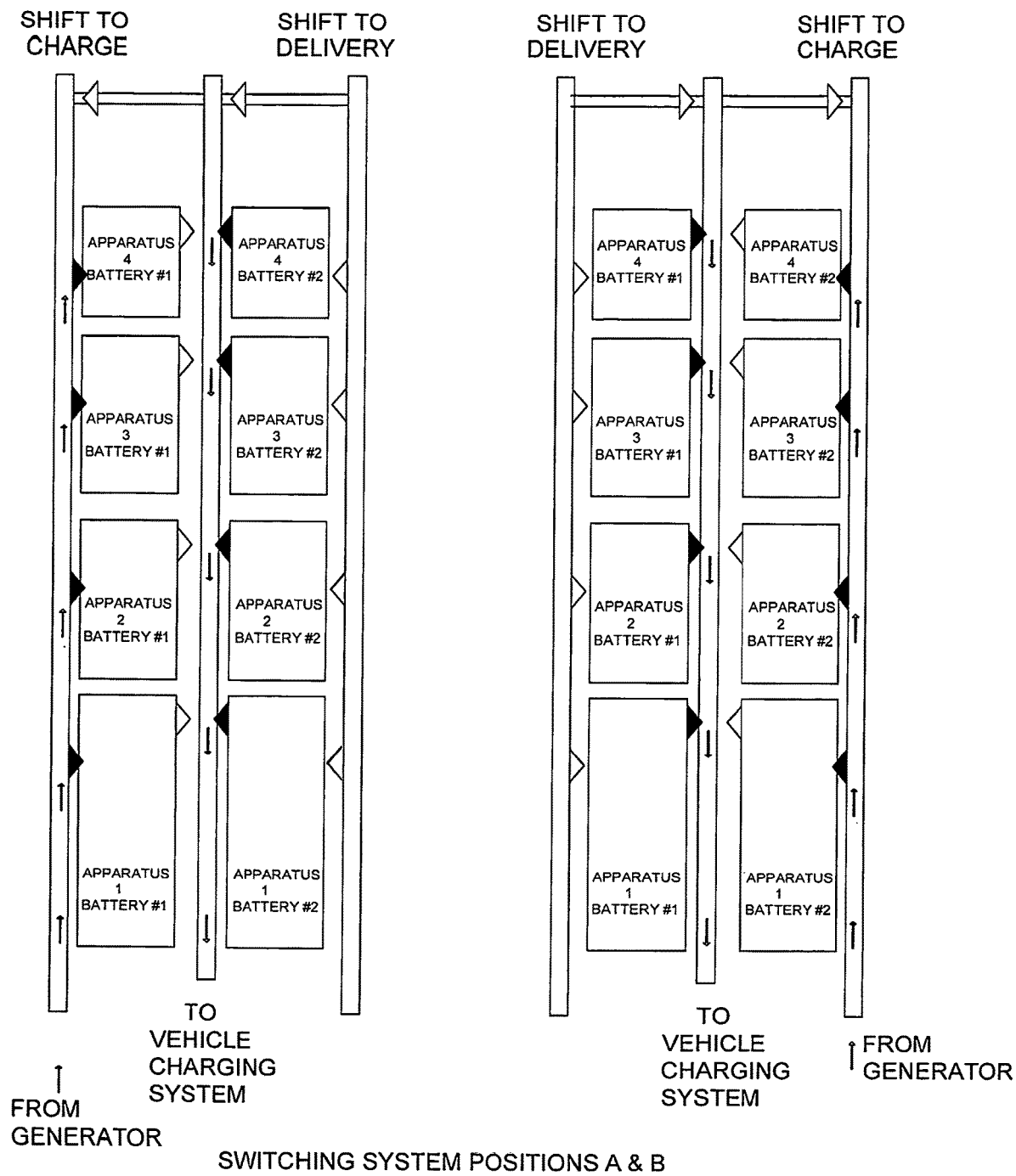
FIG. 28. Displays the switching system in charge and release positions of energy supply to enhance the power of the vehicle manufacturer's on-board batteries already in the vehicle prior to the installation of the Airflow Power Generating Apparatus.
Figure 29:
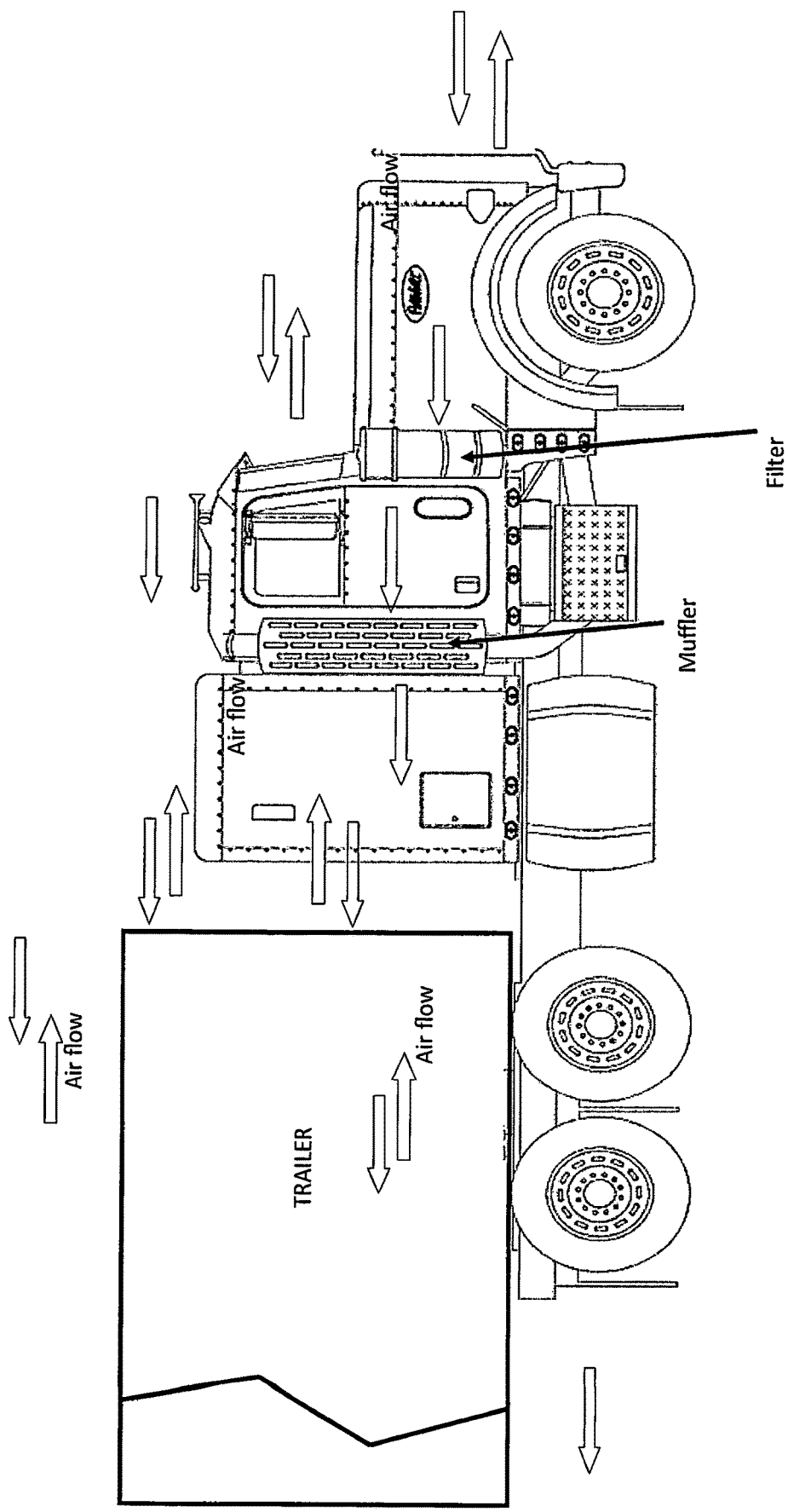
FIG. 29. Displays air resistance on a tractor trailer without the Airflow Power Generating Apparatus installed.
Figure 30:
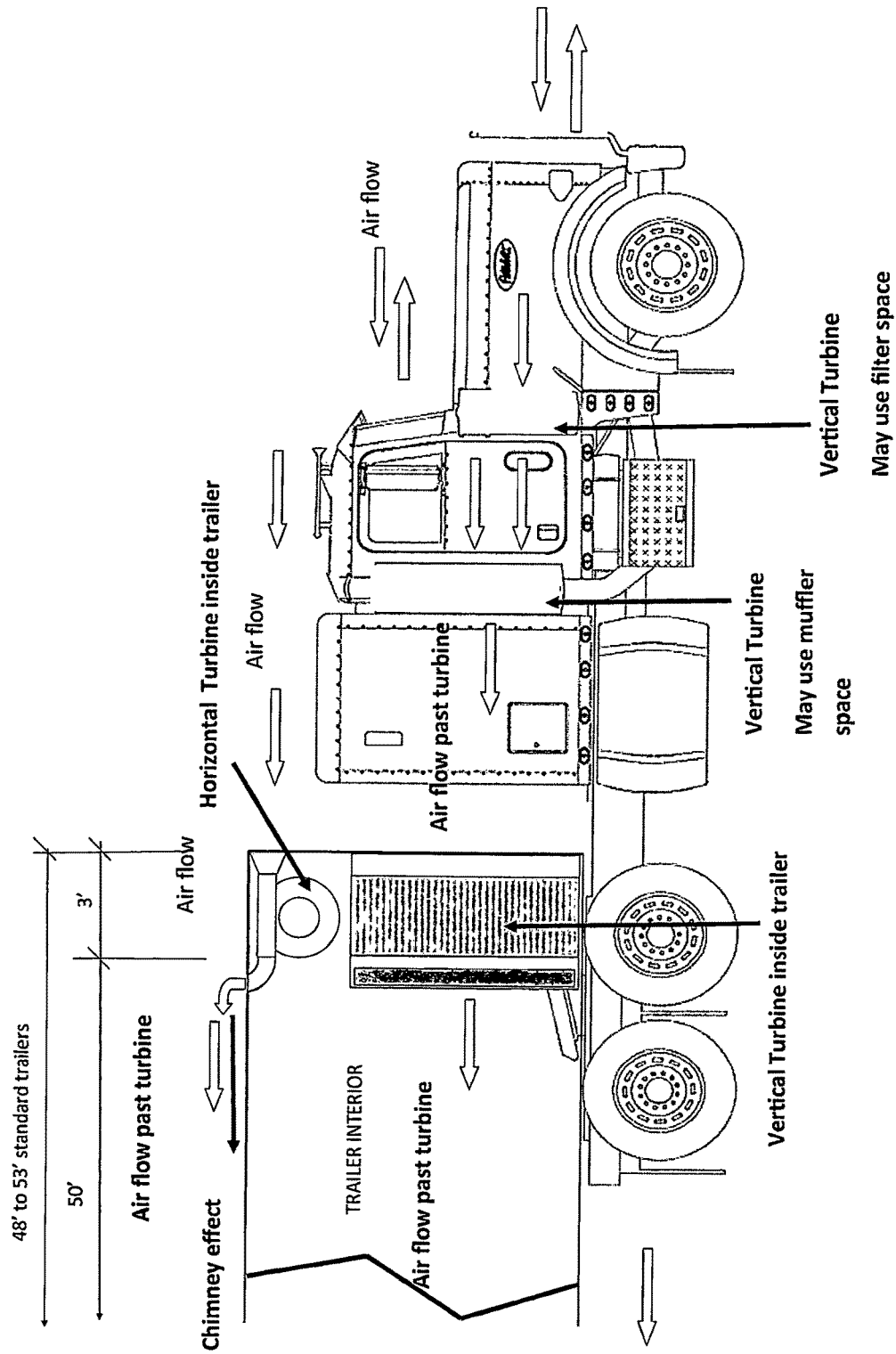
FIG. 30. Displays same tractor trailer of FIG. 29 where a plurality of Airflow Power Generating apparatuses are installed in areas of air resistance. With the installation of such apparatuses, air resistance is reduced while providing electrical energy. Systems shown are inside the trailer and smaller apparatuses are shown taking the place where the exhaust and air filter units might have been as shown on FIG. 16. Grey arrows show airflow after passing through turbine.
Figure 31:
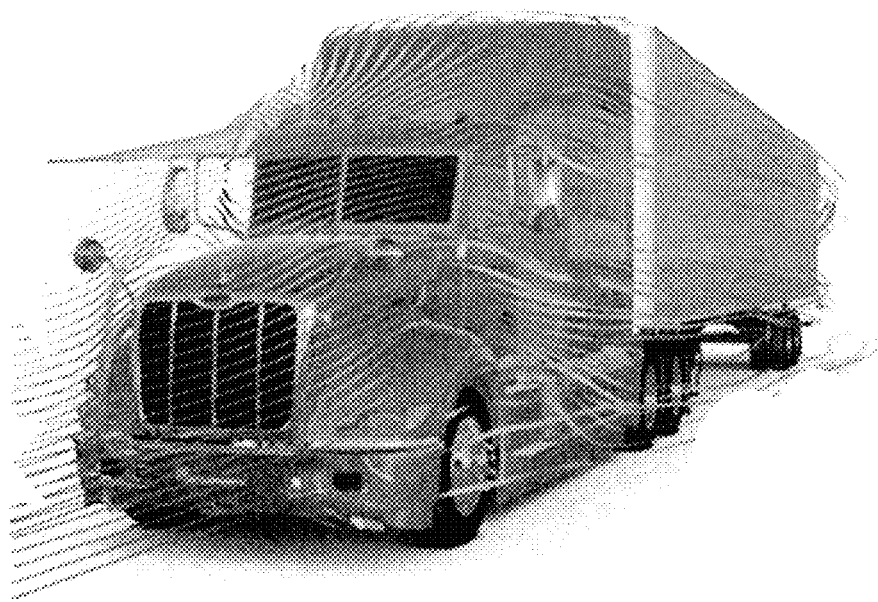
FIG. 31. Displays air flow and resistance on a typical tractor trailer.
Figure 32:
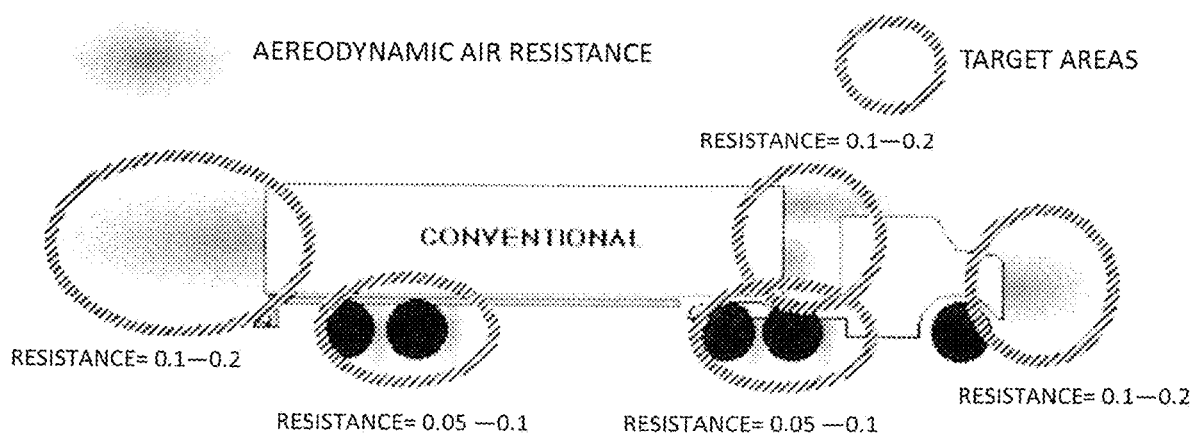
FIG. 32. Shows aerodynamic air resistance in a typical tractor trailer noting lower and higher values on most affected areas of the tractor trailer. These are locations best suited for the installation of Airflow Power Generating apparatuses.
Figure 33:
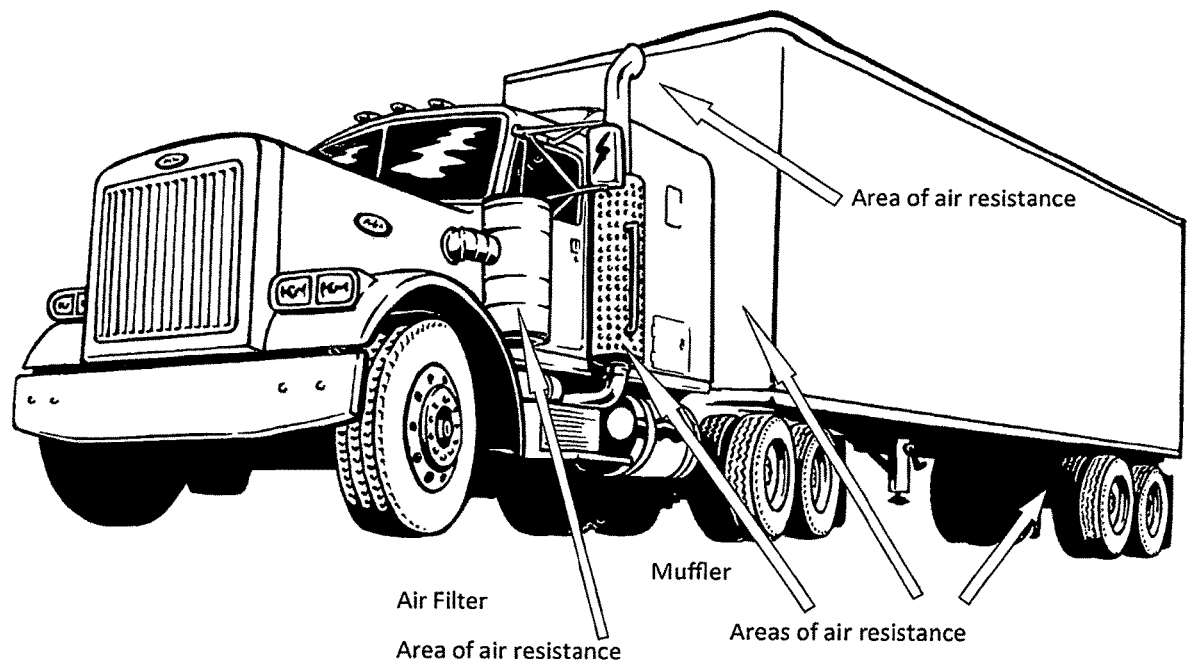
FIG. 33. Figure indicates some of the areas of highest air resistance in a typical tractor trailer.
Figure 34:
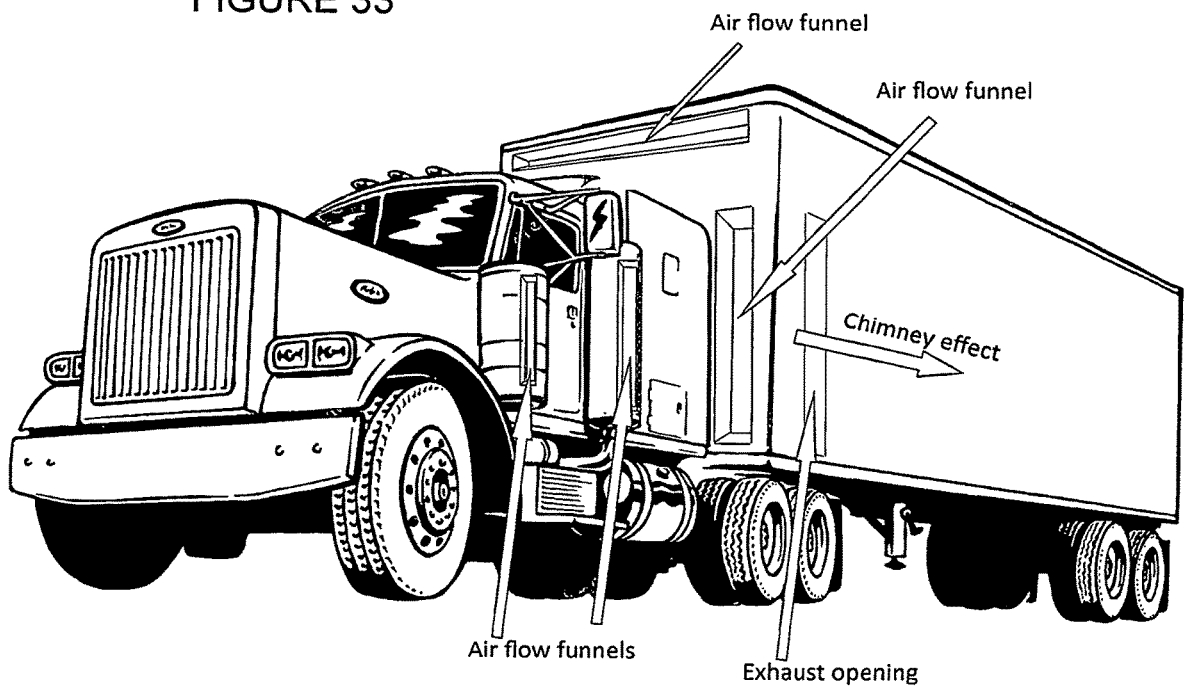
FIG. 34. Displays airflow funnels connected to apparatuses inside the trailer where airflow follows as those areas of highest air resistance become areas of least resistance within the affected surface areas. The installation of apparatuses in such locations diminish air resistance rather than increase it. In the figure, a side exhaust opening is also visible displaying how airflow crossing along the opening further reduces air resistance by the chimney effect that is produced by the fast-moving air along the side of the vehicle. The position of the funnels are the position of the Airflow Power Generating Apparatuses inside the trailer.
Figure 35:
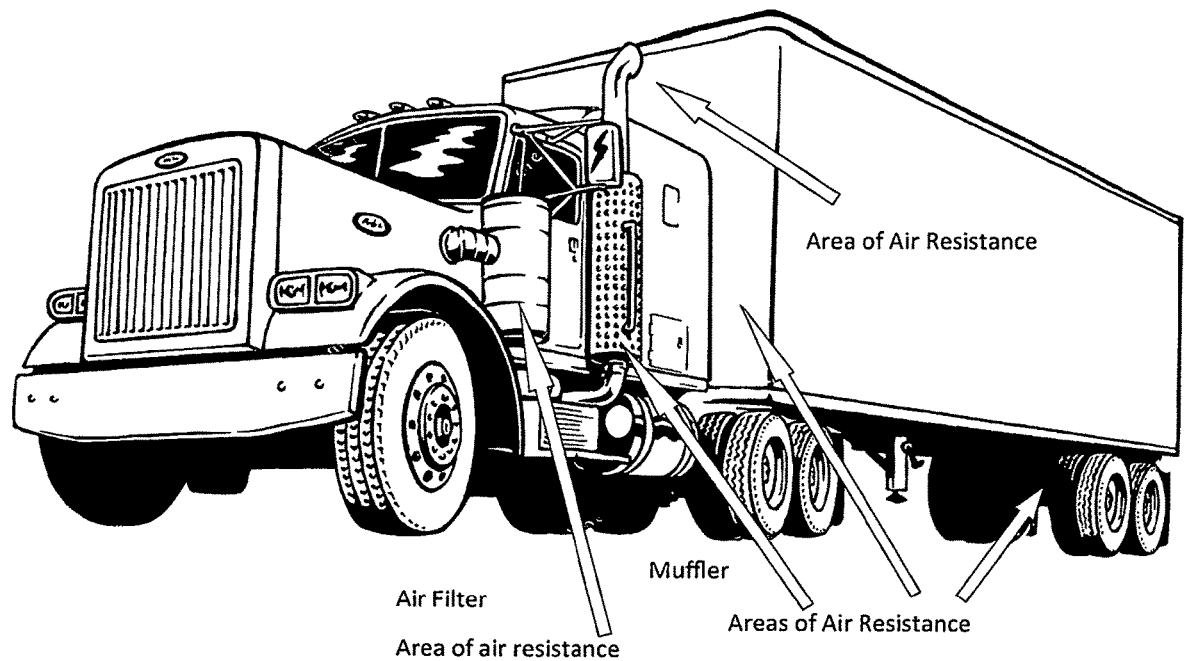
FIG. 35. Displays some areas of air resistance in a tractor trailer suitable for the installation of the Airflow Power Generating Apparatus.
Figure 36:
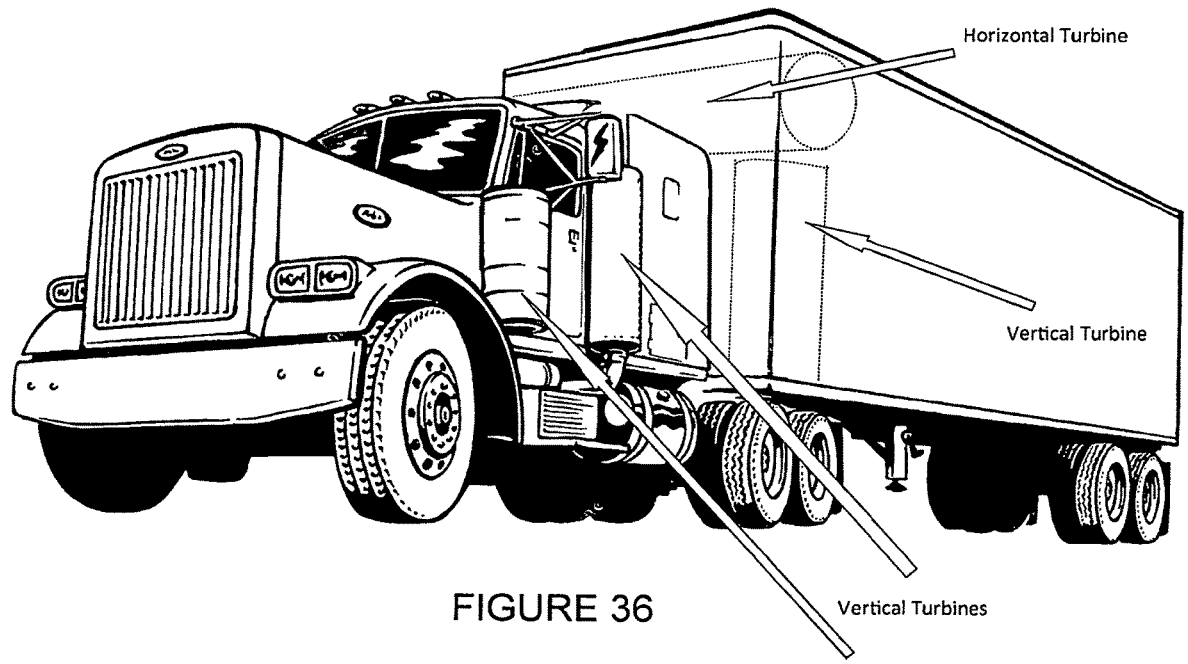
FIG. 36. Sows some locations where apparatuses may be installed in areas as displayed in FIG. 35.
Figure 37:
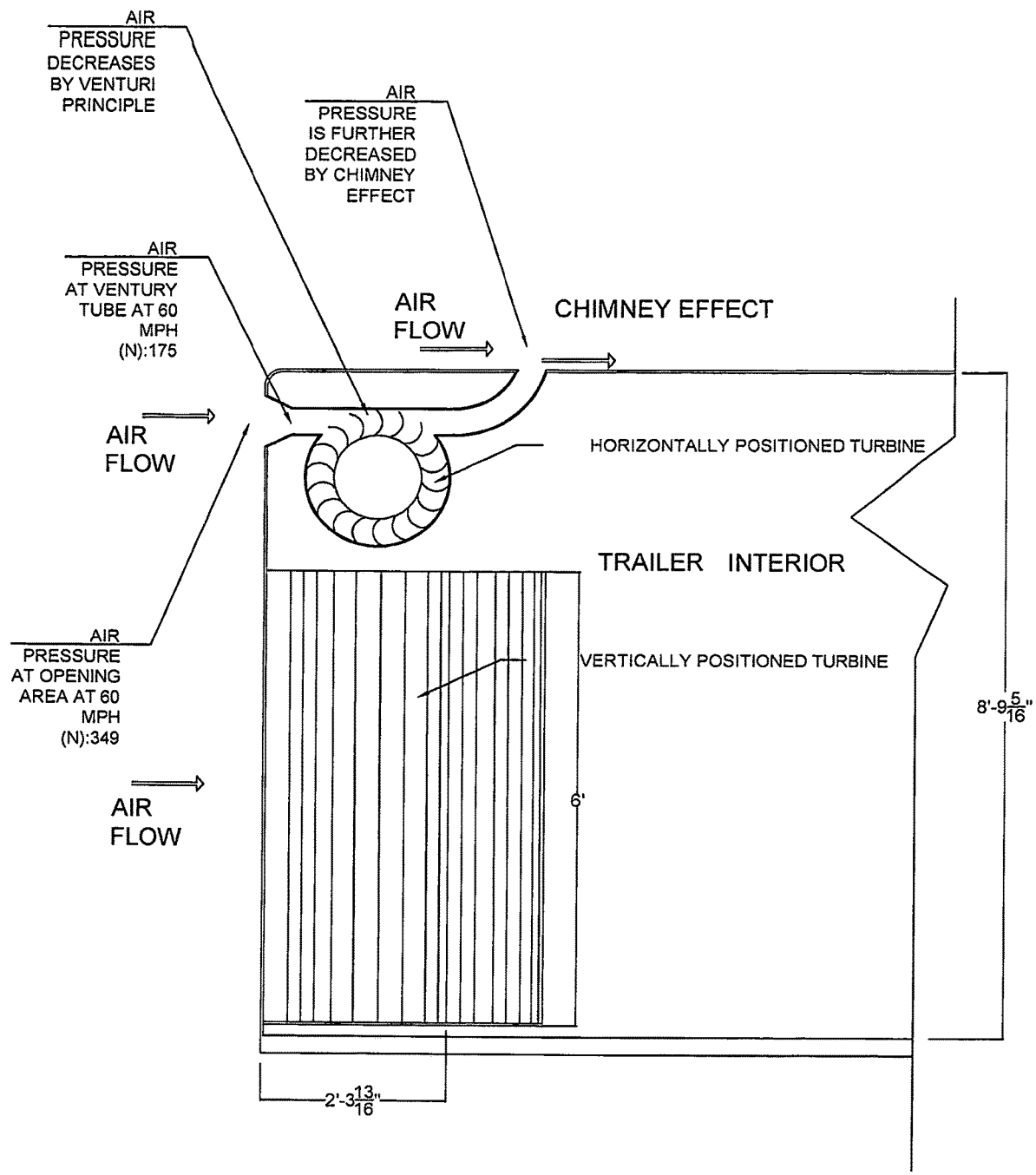
FIG. 37. Displays position of two apparatuses installed within the interior of a trailer and notes the reduction of air resistance values when apparatuses are installed in those locations; the installation of apparatuses does not add exterior surface area subject to air resistance.
Figure 39:
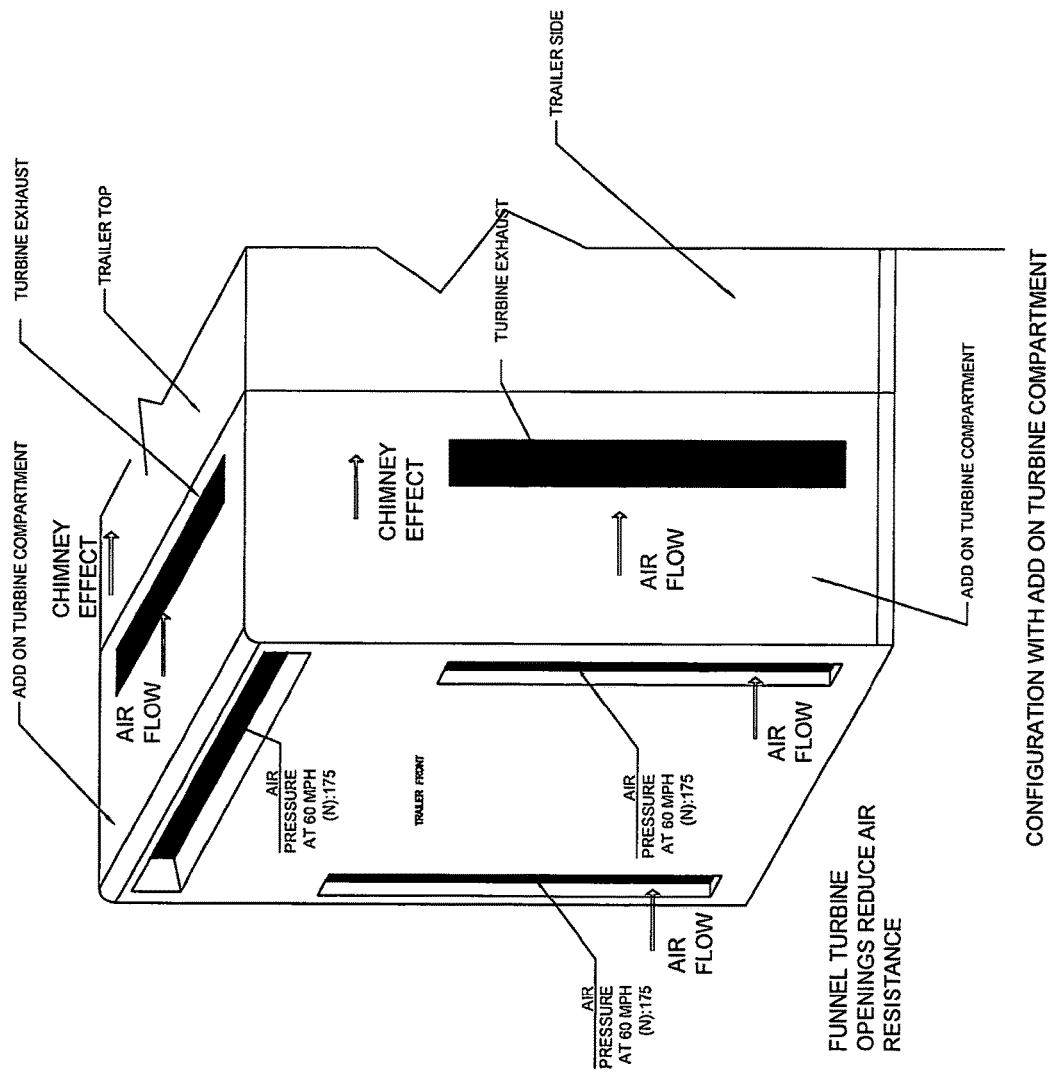
FIG. 39. Displays an add-on section at the front of the trailer where apparatuses are installed when cargo space may not be available inside the trailer.
Figure 40:
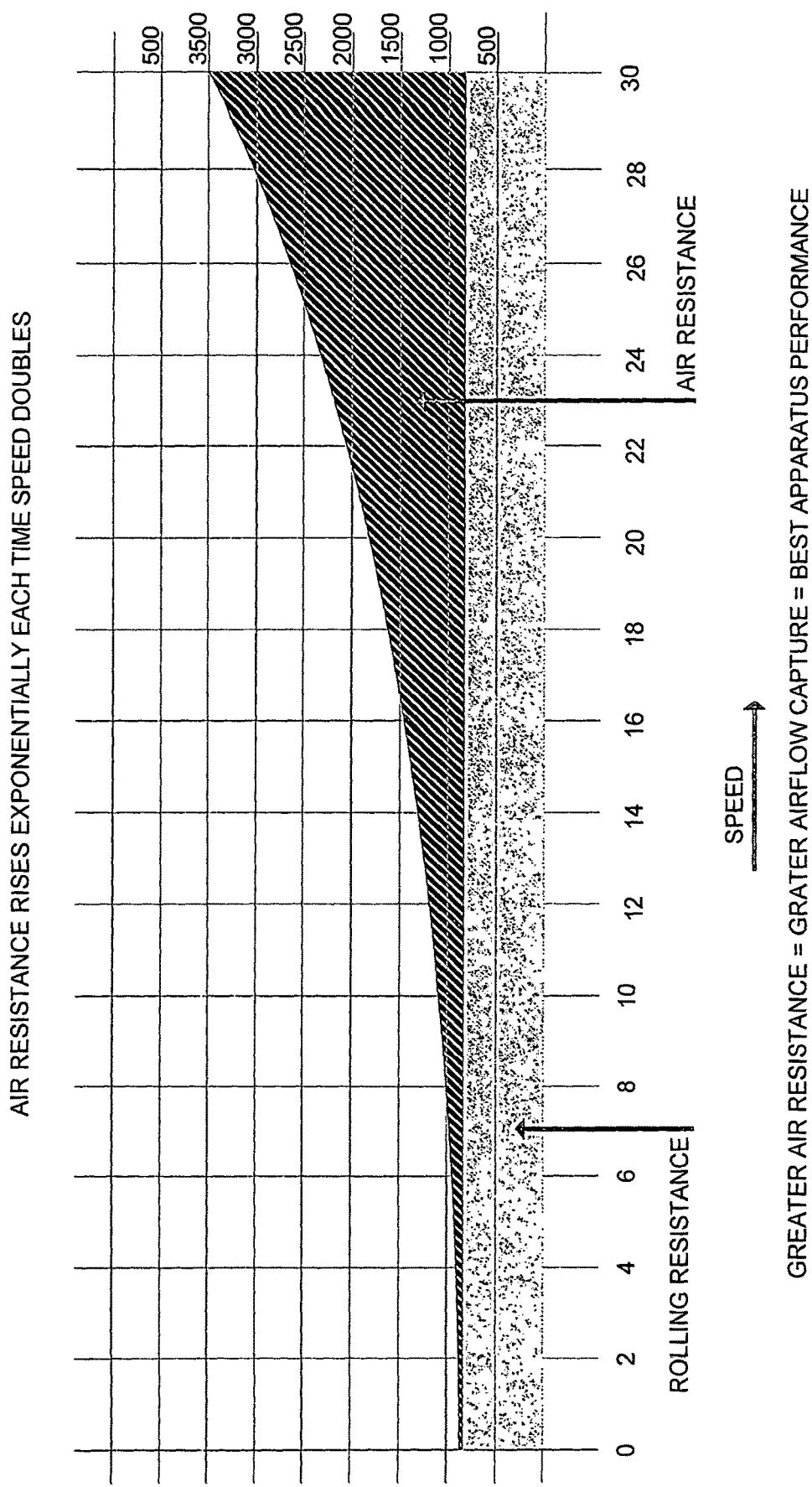
FIG. 40. Is a graphic of the relationship of air resistance versus speed. Air resistance increases exponentially every time speed increases. This is beneficial to the Airflow Power Generating Apparatus as increasing air resistance contributes to higher production of electricity as turbines spin at a greater RPM.
Figure 41:
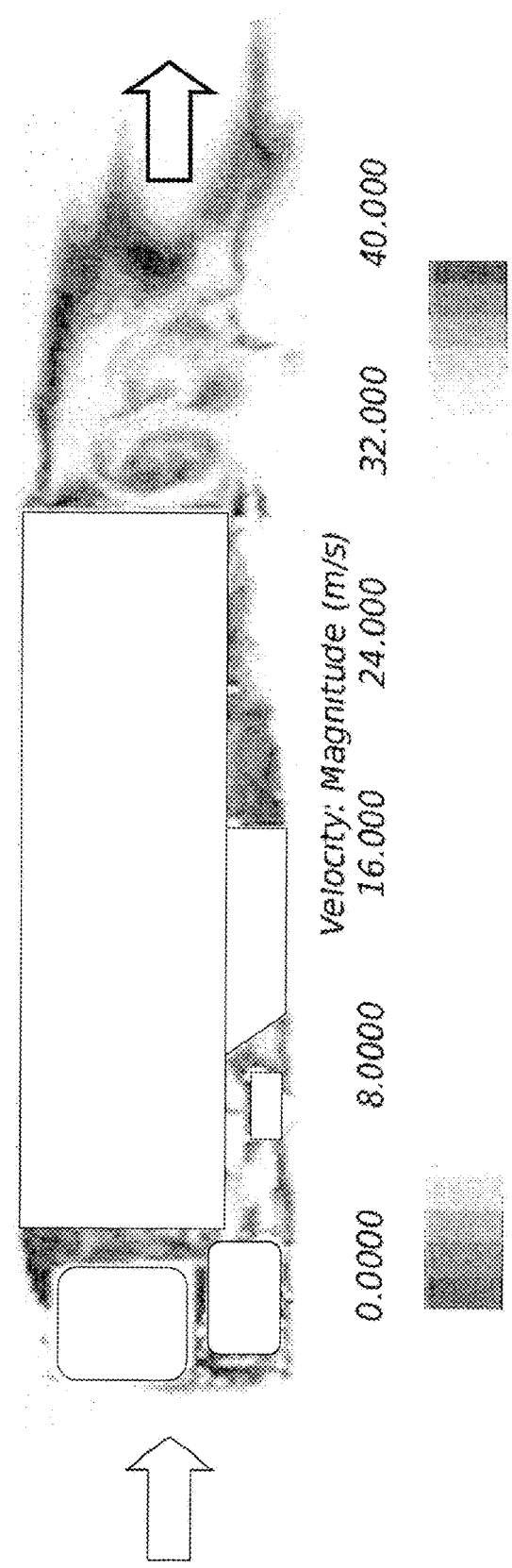
FIG. 41. Displays turbulence in rear of trailer causing air resistance on the area.
Figure 42:
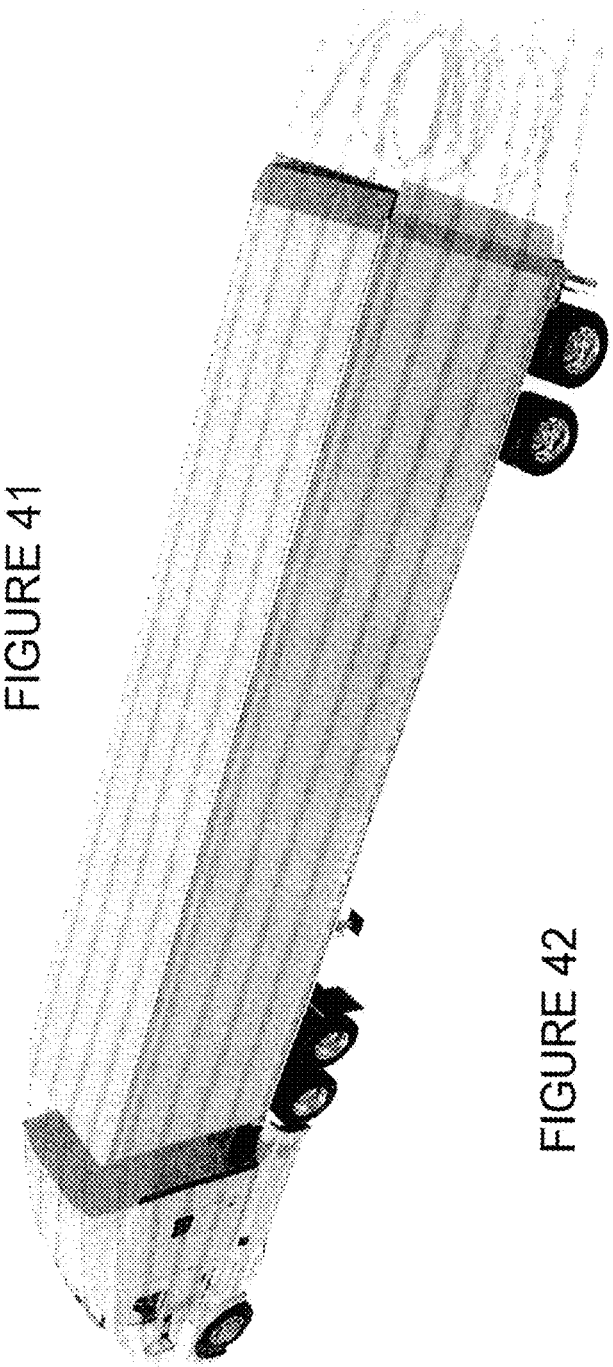
FIG. 42. Further displays areas of air resistance at the rear of a tractor trailer, suggesting a preferred location for apparatuses to be installed.
Figure 43:
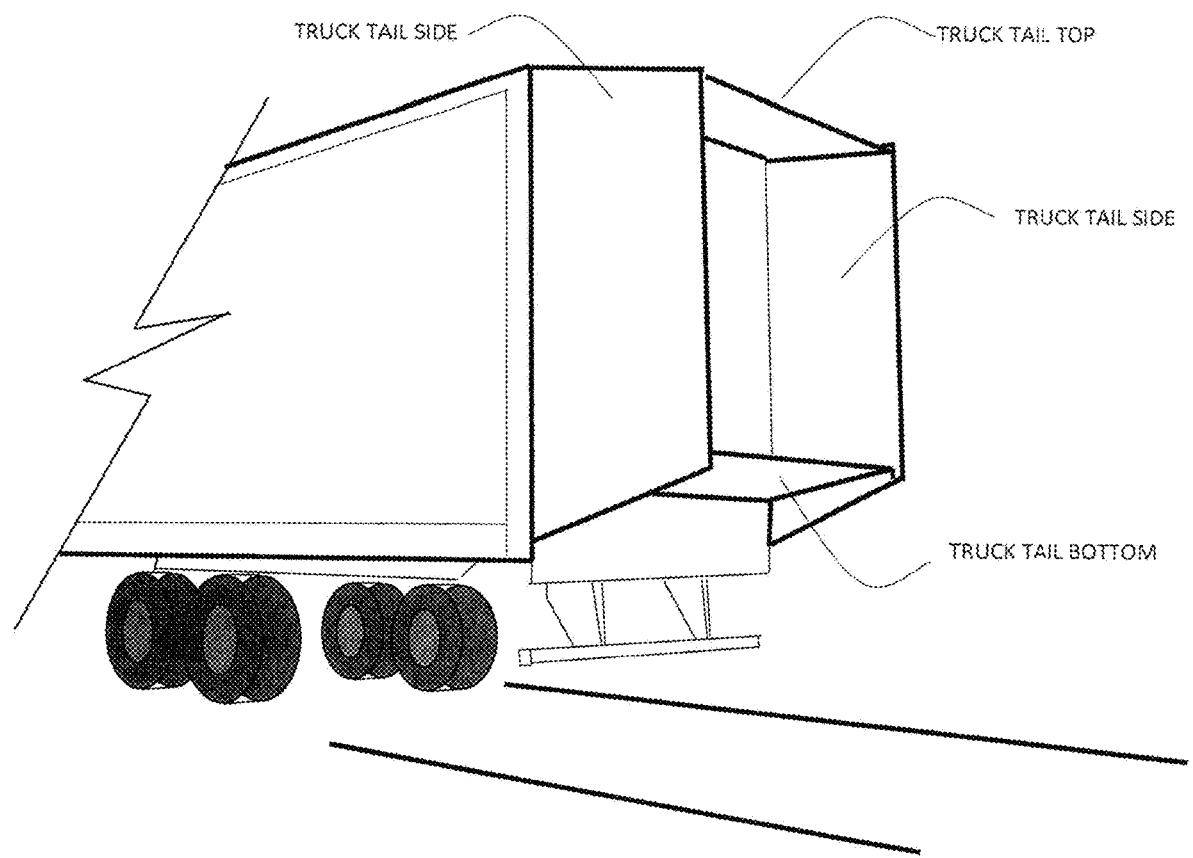
FIG. 43. Displays a common existing system used to reduce air resistance at the rear of a trailer.
Figure 45:
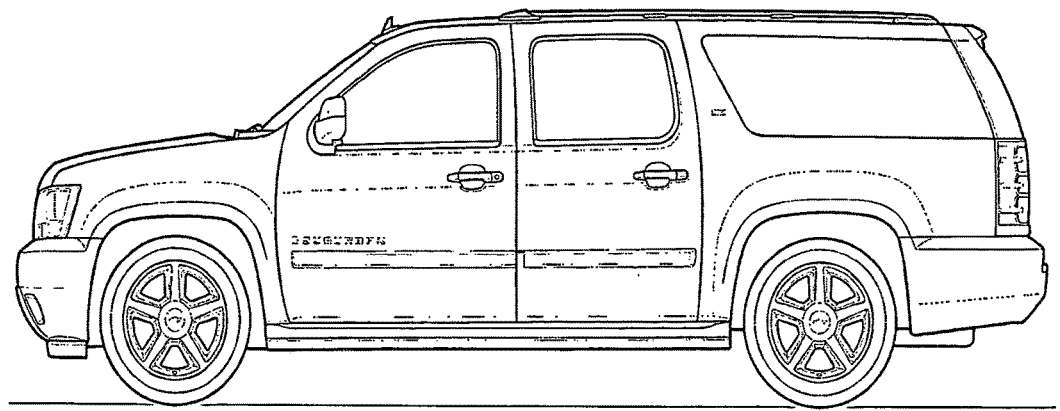
FIG. 45. Is a lateral view of a standard SUV
Figure 46:
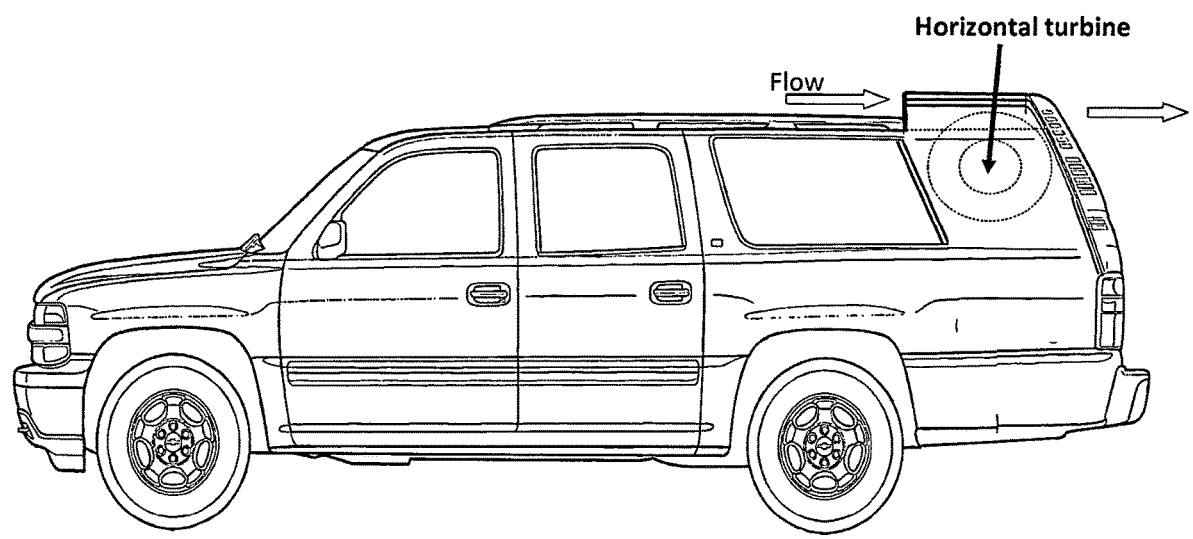
FIG. 46. Is a lateral view of the SUV of FIG. 45 where an add-on apparatus is installed.
Figure 47:
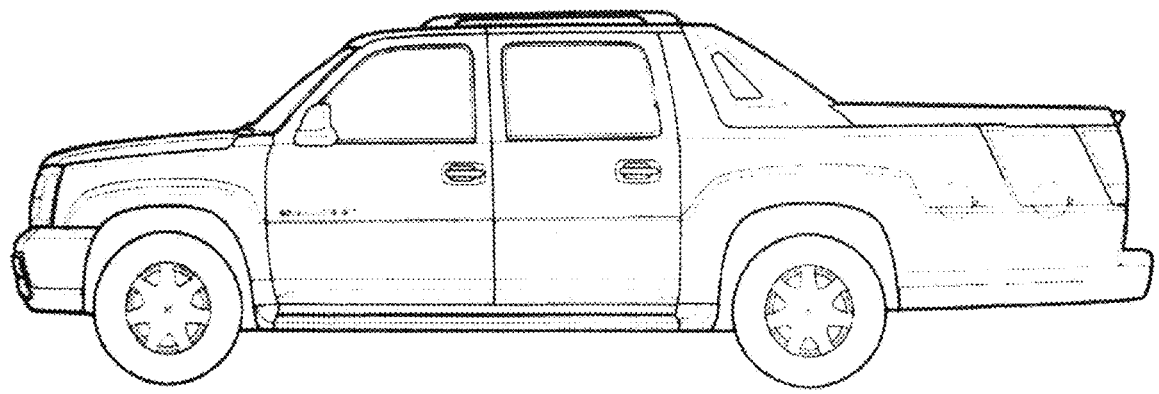
FIG. 47. Is a side view of a typical pickup truck.
Figure 48:
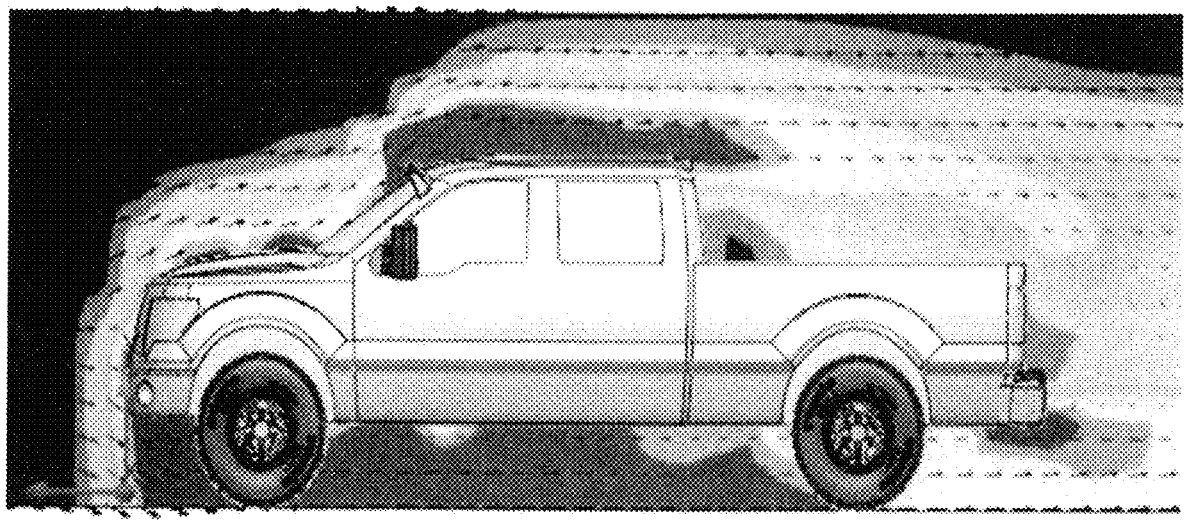
FIG. 48. Shows the areas of air resistance on a pickup truck such as the one displayed on FIG. 47.
Figure 49:
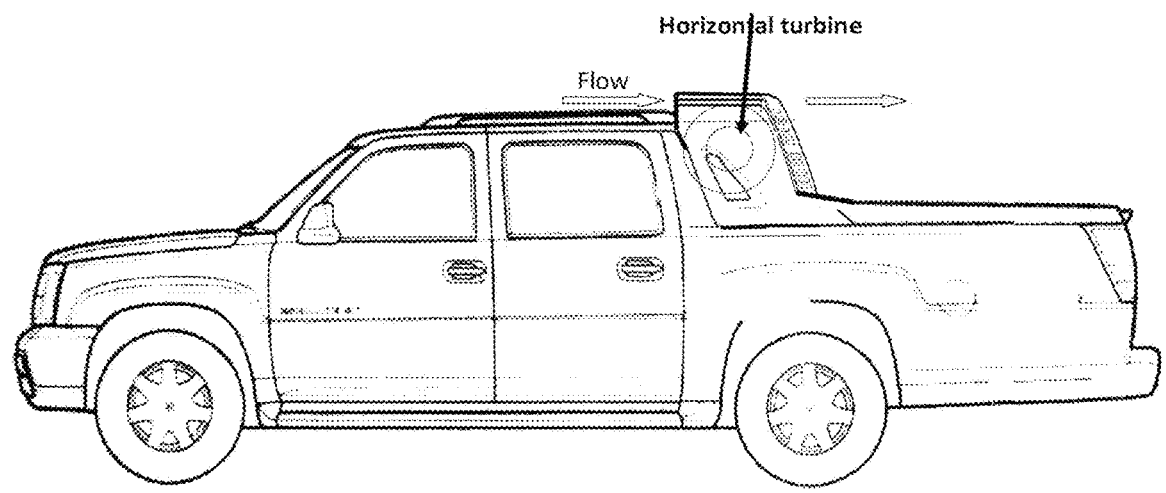
FIG. 49. Is of a horizontally positioned apparatus installed in the vehicle displayed in FIG. 47.
Figure 50:
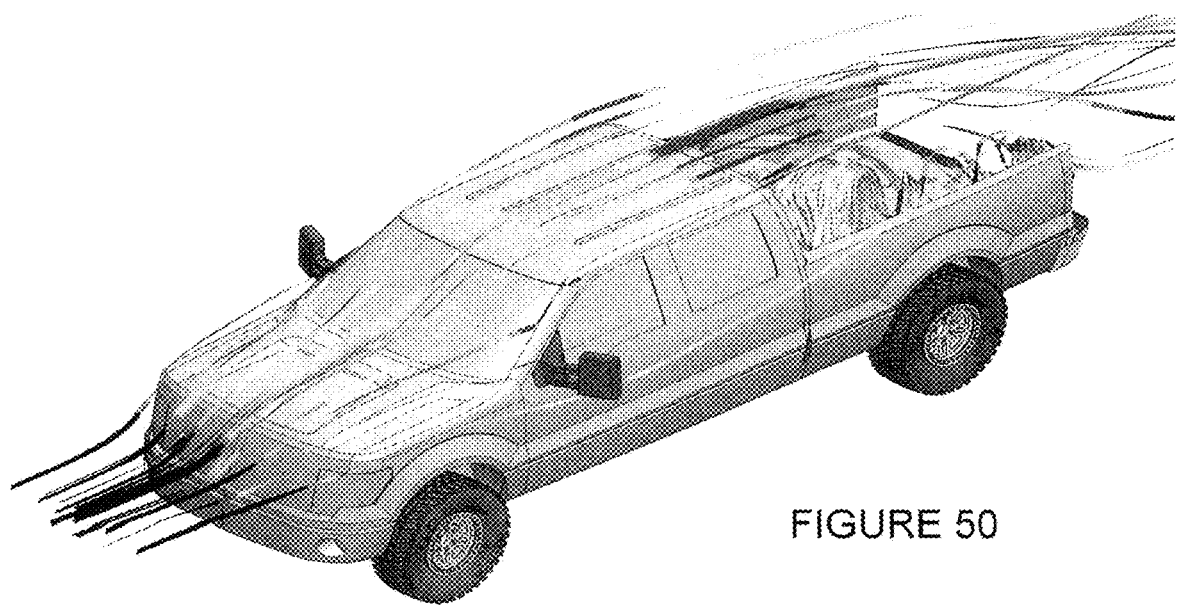
FIG. 50. Shows airflow pattern on a typical pickup truck.
Figure 51:
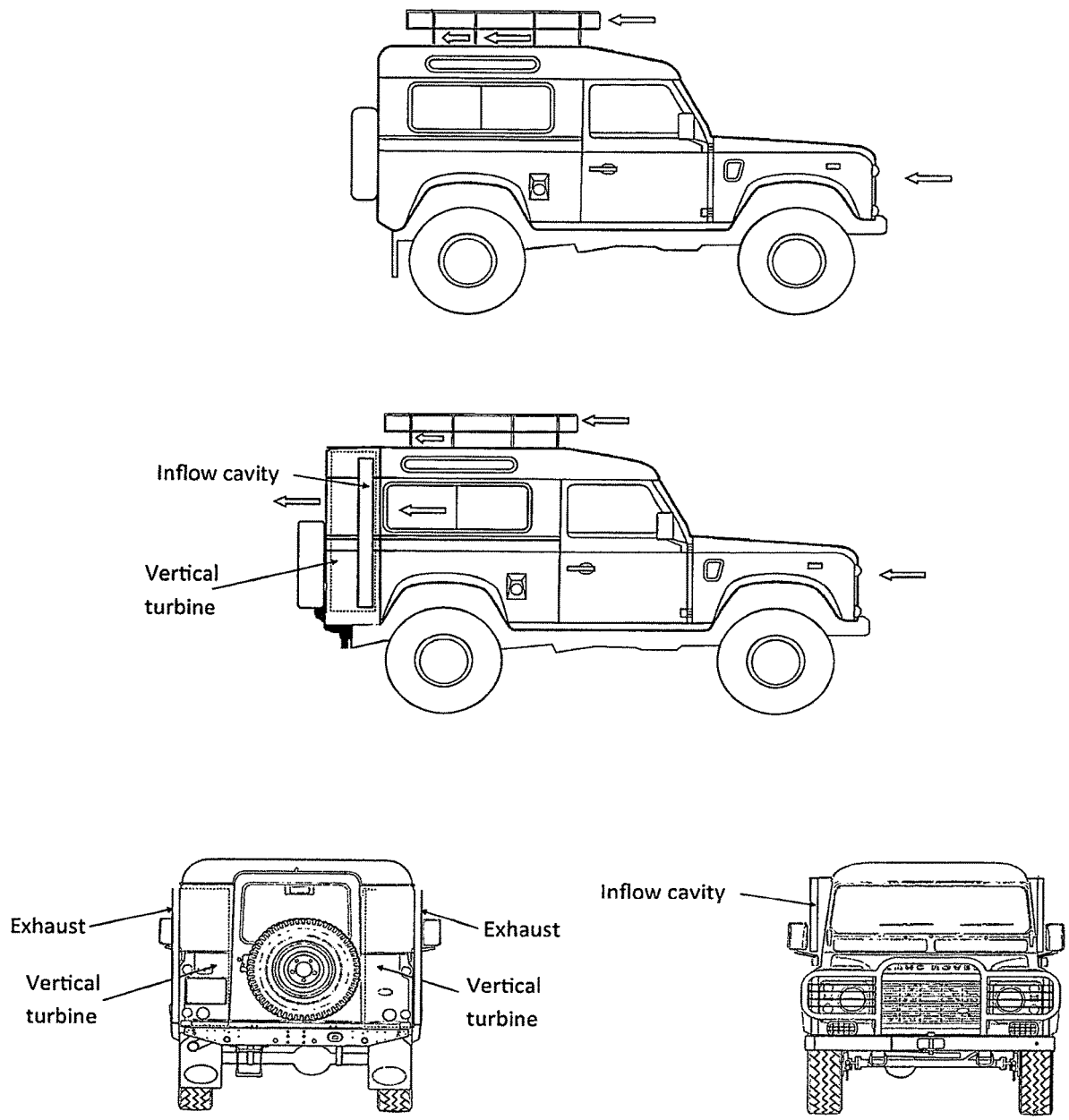
FIG. 51. Displays an SUV where add-on turbines are installed in vertical position behind the two lateral rear areas of the vehicle. These locations as all others displayed in other figures are possible because of the flexibility for the installation of the Airflow Power Generating Apparatus in multiple locations.

What is claimed is:

1. A system for generating renewable energy, the system comprising:
   a turbine;
   a casing that defines a cavity housing the turbine and a flowpath for air, wherein the flowpath includes an inlet and an outlet, and wherein the air passing through the flowpath causes the turbine to rotate within the cavity;
   a generator connected to the turbine which converts rotational motion of the turbine to electrical energy;
   a plurality of batteries connected to a battery switching system that selectively connects the plurality of batteries to one of the generator and an electric load, wherein at least one battery of the plurality of batteries in a charging state that is isolated from the electric load to store the electrical energy generated by the generator while at least one other battery of the plurality of batteries in a discharging state that is isolated from the generator to supply stored electrical energy to the electrical load, wherein the battery switching system switches the at least one battery from the charging state to the discharging state and switches the at least one other battery from the discharging state to the charging state; and wherein the casing further comprises:
- a grille that spans the inlet;
- a set of spray nozzles that sprays a fluid into the cavity; and
- a set of de-icing elements disposed on the casing.

2. The system of claim 1, wherein the casing further comprises a diffuser located at the outlet of the flowpath.

3. The system of claim 1, wherein the turbine includes a plurality of blades, and wherein the flowpath is positioned to expose only some blades in the plurality of blades to the air flowing through the flowpath.

4. The system of claim 1, wherein components of the system are housed within a vehicle, and wherein the inlet of the flowpath is exposed at an external surface of the vehicle at a location that experiences wind resistance when the vehicle is in forward motion.

5. The system of claim 1, wherein the turbine is connected to the generator through a gear system.

6. The system of claim 5, wherein the turbine is connected to a plurality of generators.

7. The system of claim 1, wherein the set of de-icing elements is disposed on a portion of the casing that envelops the turbine.

8. A vehicle comprising:
a system for generating renewable energy while the vehicle is in motion and exposed to wind resistance, the system including:
- a turbine;
- a casing that defines a cavity housing the turbine and a flowpath for air, wherein the flowpath includes an inlet and an outlet, and wherein the air passing through the flowpath causes the turbine to rotate within the cavity;
- a generator connected to the turbine which converts rotational motion of the turbine to electrical energy;
- a plurality of batteries connected to a battery switching system that selectively connects the plurality of batteries to one of the generator and an electric load, wherein at least one battery of the plurality of batteries in a charging state that is isolated from the electric load to store the electrical energy generated by the generator while at least one other battery of the plurality of batteries in a discharging state that is isolated from the generator to supply stored electrical energy to the electrical load, wherein the battery switching system switches the at least one battery from the charging state to the discharging state and switches the at least one other battery from the discharging state to the charging state; and
wherein the casing further comprises:
- a grille that spans the inlet;
- a set of spray nozzles that sprays a fluid into the cavity; and
- a set of de-icing elements disposed on the casing.

9. The vehicle of claim 8, wherein the casing further comprises a diffuser located at the outlet of the flowpath.

10. The vehicle of claim 8, wherein the turbine includes a plurality of blades, and wherein the flowpath is positioned to expose only some blades in the plurality of blades to the air flowing through the flowpath.

11. The vehicle of claim 8, wherein components of the system are housed within the vehicle, and wherein the inlet of the flowpath is exposed at an external surface of the vehicle at a location that experiences wind resistance when the vehicle is in forward motion.

12. The vehicle of claim 8, wherein the turbine is connected to the generator through a gear system.

13. The vehicle of claim 12, wherein the turbine is connected to a plurality of generators.

14. The vehicle of claim 8, wherein the set of de-icing elements is disposed on a portion of the casing that envelops the turbine.

15. A method for generating renewable energy, the method comprising:
- directing air from wind resistance into an inlet of a flowpath defined by a casing, wherein the casing also defines a cavity housing a turbine that rotates within the cavity as a result of the air flowing through the flowpath from the inlet to an outlet, wherein the casing further comprises a grille that spans the inlet, a set of spray nozzles that sprays a fluid into the cavity, and a set of de-icing elements disposed on the casing;
- converting, by a generator connected to the turbine, rotational motion of the turbine into electrical energy;
- storing the electrical energy in at least one battery of a plurality of batteries while the at least one battery is in a charging state and isolated from an electric load;
- supplying stored electrical energy to an electrical load by at least one other battery while the at least one other battery is in a discharging state and isolated from the generator, and while the at least one battery is in a charging state;
- switching, by a switching system, the at least one battery to a discharging state by isolating the at least one battery from the generator and connecting the at least one battery to the electric load; and
- switching, by the switching system, the at least one other battery to a charging state by isolating the at least one other battery from the electric load and connecting the at least one other battery to the generator.

16. The method of claim 15, further comprising:
controlling activation of the set of de-icing elements based on a thermostat.

17. The method of claim 15, further comprising:
spraying the cavity with fluid from the set of spray nozzles.

18. The method of claim 15, further comprising:
expelling the air from the casing through a diffuser positioned at the outlet of the flowpath.

19. The method of claim 15, further comprising:
synchronizing a rotational speed of the generator with a rotational speed of the turbine.

20. The method of claim 15, wherein the at least one battery is switched from the charging state to the discharging state and the at least one other battery is switched from the discharging state to the charging state in response to reaching a level of charge in the at least one battery or the at least one other battery.

* * * * *